US009461730B2

(12) United States Patent
Wilhelmsson et al.

(10) Patent No.: US 9,461,730 B2
(45) Date of Patent: *Oct. 4, 2016

(54) SELF-INTERFERENCE SUPPRESSION CONTROL FOR A RELAY NODE

(75) Inventors: Leif Wilhelmsson, Dalby (SE); Lars Sundström, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 237 days.

This patent is subject to a terminal disclaimer.

(21) Appl. No.: 13/880,529

(22) PCT Filed: Sep. 22, 2011

(86) PCT No.: PCT/EP2011/004755
§ 371 (c)(1),
(2), (4) Date: Jun. 25, 2013

(87) PCT Pub. No.: WO2012/055468
PCT Pub. Date: May 3, 2012

(65) Prior Publication Data
US 2013/0279399 A1 Oct. 24, 2013

Related U.S. Application Data

(60) Provisional application No. 61/407,977, filed on Oct. 29, 2010, provisional application No. 61/412,548, filed on Nov. 11, 2010.

(51) Int. Cl.
*H04B 7/155* (2006.01)
*H04B 15/00* (2006.01)

(52) U.S. Cl.
CPC .......... *H04B 7/15585* (2013.01); *H04B 7/155* (2013.01); *H04B 15/00* (2013.01)

(58) Field of Classification Search
CPC ... H04B 7/15585; H04B 7/155; H04B 15/00
See application file for complete search history.

(56) References Cited

U.S. PATENT DOCUMENTS 4,701,935 A   10/1987   Namiki
5,596,439 A   1/1997   Dankberg et al.
(Continued)

FOREIGN PATENT DOCUMENTS

EP   2 053 812 A2       4/2009
EP   2053812 A2 *       4/2009
(Continued)

OTHER PUBLICATIONS

International Search Report and Written Opinion dated Dec. 28, 2011 for International Application No. PCT/EP2011/004755, International Filing Date: Sep. 22, 2011 consisting of 13-pages.
(Continued)

*Primary Examiner* — Ian N Moore
*Assistant Examiner* — Latresa McCallum
(74) *Attorney, Agent, or Firm* — Christopher & Weisberg, P.A.

(57) ABSTRACT

A technique for controlling suppression of self-interference in a relay node configured to transmit and receive simultaneously using the same frequency channel or using proximate frequency channels is provided. A method implementation of this technique comprises the steps of actively cancelling a signal transmitted from the relay node that leaks back into a receiver of the relay node to suppress self-interference, determining whether an increase of an amount of self-interference suppression is needed or whether self-interference suppression can be decreased, and increasing or decreasing, depending on the result of the determination, at least one of the transmit power of the signal transmitted from the relay node and the receive power of the relay node.

17 Claims, 19 Drawing Sheets

(56) References Cited

U.S. PATENT DOCUMENTS

| | | | |
|---|---|---|---|
| 6,996,164 | B1 | 2/2006 | Blount et al. |
| 7,151,761 | B1* | 12/2006 | Palenius .............. H04B 1/7103 370/335 |
| 7,280,799 | B1 | 10/2007 | Najafi et al. |
| 2003/0031279 | A1 | 2/2003 | Blount et al. |
| 2007/0041440 | A1 | 2/2007 | Schoenbeck et al. |
| 2007/0071072 | A1* | 3/2007 | Banister .............. H04B 1/7117 375/148 |
| 2007/0188235 | A1 | 8/2007 | Dean |
| 2007/0191071 | A1 | 8/2007 | Spampinato et al. |
| 2008/0013618 | A1 | 1/2008 | Kim et al. |
| 2008/0293360 | A1 | 11/2008 | Maslennikov et al. |
| 2009/0286474 | A1 | 11/2009 | Park et al. |
| 2010/0118922 | A1 | 5/2010 | Ahn |
| 2010/0167639 | A1* | 7/2010 | Ranson ................... H04B 7/15 455/24 |
| 2010/0272005 | A1* | 10/2010 | Larsson et al. ............... 370/315 |
| 2010/0281339 | A1* | 11/2010 | Myers ....................... H03J 7/02 714/758 |
| 2011/0105037 | A1 | 5/2011 | Narasimha et al. |

FOREIGN PATENT DOCUMENTS

| | | | |
|---|---|---|---|
| EP | 2 068 460 | A2 | 6/2009 |
| EP | 2 194 663 | A2 | 6/2010 |

OTHER PUBLICATIONS

2nd Written Opinion dated Oct. 22, 2012 for International Application No. PCT/EP2011/004755, International Filing Date: Sep. 22, 2011 consisting of 8-pages.

International Report on Patentability dated Jan. 30, 2013 for International Application No. PCT/EP2011/004755, International Filing Date: Sep. 22, 2011 consisting of 9-pages.

3GPP TSG-RAN WG1 #56, PUBATTR/, Draft R1-091049 , Qualcomm Europe: "Preference for Relay Operation in LTE-A", Athens, Greece; Feb. 16, 2009; XP050318865 [retrieved on Feb. 16, 2009] consisting of 11-pages.

Eun-Ji Yoo et al., "Self-Interference Cancellation Method based V-BLAST in MIMO Systems", pp. 800-803, Advanced Communication Technology, 2009. ICACT 2009. 11th International Conference on,—Feb. 15, 2009—GIRI, Piscataway, NJ, USA, ISBN 978-89-5519-138-7 ; ISBN 89-5519-138-3, XP031446219, consisting of 4-pages.

International Search Report and Written Opinion dated Dec. 20, 2011 for International Application No. PCT/EP2011/004756, International Filing Date: Sep. 22, 2011 consisting of 14-pages.

2nd Written Opinion dated Oct. 22, 2012 for International Application No. PCT/EP2011/004756, International Filing Date: Sep. 22, 2011 consisting of 9-pages.

International Report on Patentability dated Jan. 30, 2013 for International Application No. PCT/EP2011/004756, International Filing Date: Sep. 22, 2011 consisting of 22-pages.

1st Office Action dated Mar. 30, 2015, in U.S. Appl. No. 13/880,533, filed Jun. 25, 2003 (24-pages).

Final Rejection Office Action dated Jul. 16, 2015, in U.S. Appl. No. 13/880,533, filed Jun. 25, 2003 (20-pages).

Office Action dated Jun. 23, 2016, in U.S. Appl. No. 13/880,533, filed Jun. 25, 2013 consisting of 22-pages.

* cited by examiner

SELF-INTERFERENCE SUPPRESSION CONTROL FOR A RELAY NODE

TECHNICAL FIELD

The present disclosure generally relates to a technique for controlling suppression of self-interference in a relay node. In particular, self-interference suppression control for a relay node configured to transmit and receive simultaneously using the same frequency channel or proximate frequency channels is described.

BACKGROUND

A radio access connection in a cellular communication system typically stretches between a base station and a user terminal served by the base station. A relay node is intended to give increased coverage (i.e., to extend the radio access connection) without the need to install a further base station.

When a relay node is included in a radio access connection between a base station and a user terminal, the base station is referred to as a donor base station. The communication link stretching between the donor base station and the relay node is referred to as backhaul link (also denoted Un), whereas the communication link stretching between the relay node and the user terminal is referred to as the access link (also denoted Uu).

A relay node has two transmitters and two receivers, one each for the backhaul link and the access link. In general, care has to be taken when operating the two links in order to ensure that they do not interfere with one another. In particular, it has to be ensured that the receiver for one link does not experience strong interference from the transmitter for the other link ("self-interference").

FIG. 1 illustrates an exemplary communication scenario involving a base station 10, a user terminal 20 and a relay node 30 extending a radio access connection 40 between the base station 10 and the user terminal 20. The relay node 30 defines a relay cell 50 in which the user terminal 20 is served. In the downlink (DL) from the base station 10 to the user terminal 20, the relay node 30 receives data from the base station 10, decodes and re-encodes it, and then transmits the re-encoded data to the user terminal 20. In the uplink (UL) the same steps are performed by the relay node 30, but in the other direction from the user terminal 20 to the base station 10. The relay node 30 can generally have a similar output power as the base station 10. Still, there are many deployment scenarios in which a significantly lower output power of the relay node 30 will suffice.

One alternative to a relay node is a repeater. In a repeater, the data is not decoded and re-encoded, but rather the signal is just amplified and re-transmitted. For this reason repeater operation is also referred to as Amplify and Forward (AF), whereas relay operation is commonly referred to as Decode and Forward (DF).

A repeater will be faced with the problem that it needs to receive a rather weak signal at the same time as it is transmitting a signal that is considerably stronger. While the power of the received signal might be in the order of −80 dBm, the power of the transmitted signal might be in the order of 0 dBm. To avoid self-interference and a resulting self-oscillation, this puts rather hard requirements on the amount of isolation required. As a rule-of-thumb, the isolation should be about 10 dB higher than the amplification of the signal. For instance, if the amplification is 80 dB as in the example above, then the isolation should be about 90 dB.

In Eun-Ji Yoo et al., "Self-Interference Cancellation Method based on V-BLAST in MIMO Systems", ICACT 2009, p. 800-803, Feb. 15-18, 2009 (ISBN 978-89-5519-139-4) a technique for cancelling self-interference in a repeater is described. The technique comprises the establishment of a feedback channel between an input and an output of an amplifier of the repeater. In addition, an adaptive filter is provided that is based on a Least-Mean-Square (LMS) algorithm for cancelling self-interference.

It has been found that there is a crucial difference between a repeater and a relay node when it comes to the fundamental mechanisms underlying self-interference. Since a repeater does not decode the information, the requirements for self-interference suppression will be set by the quality of the transmitted (amplified) signal. For a relay node, on the other hand, the received signal needs to be decoded, which means that the requirements will be determined by the requirements of the receiver in the relay node.

There are two different approaches for a relay node to avoid or at least significantly reduce interference, and in particular self-interference. According to a first approach, the two links use different frequency bands (out-of-band relaying), in which case coexistence of the two links is ensured by means of filtering. According to a second approach, the two links use different time slots in a frame structure so that coexistence is ensured by means of scheduling (in-band relaying).

The second approach, which is based on the use of different time slots, implies restrictions on the maximum data rate as well as on the scheduling of the individual transmissions. One drawback of the first approach is the fact that different frequency bands are needed for the two links. This need implies that twice the amount of spectrum is required for operating both links (compared to a communication scenario without a relay node). Also, the frequency separation between the two links must be rather large to make filtering feasible. If the separation is not large enough, so that no filtering can be applied in the receivers of the relay node, the relay node will experience strong self-interference.

SUMMARY

There is a need for a relay node that is less susceptible to self-interference.

According to one aspect, a relay node configured to control suppression of self-interference is provided, wherein the relay node comprises a transmitter and a receiver and wherein the relay node is adapted to transmit and receive simultaneously using the same frequency channel or using proximate frequency channels. The relay node also comprises an interference signal estimator having a first input adapted to receive a transmitter signal from the transmitter, a second input adapted to receive adaptation metric, and an output adapted to output an estimated interference signal generated by the interference signal estimator based on the transmitter signal and the adaptation metric, and a subtractor coupled to the output of the interference signal estimator and configured to subtract the estimated interference signal from a received signal in the receiver so as to actively cancel a signal transmitted from the relay node that leaks back into the receiver of the relay node to suppress self-interference.

The first input of the interference signal estimator may be coupled to a digital baseband stage of the transmitter. The first input may, in addition or as an alternative, also be coupled to other stages of the transmitter.

In case the first input of the interference signal estimator is coupled to the digital baseband stage of the transmitter, one or more replication blocks coupled between the first input of the interference signal estimator and the digital baseband processing stage, or included in the digital baseband processing stage, may be provided. The one or more replication blocks may be configured to replicate (or model) errors introduced by a transmitter chain in the transmitter signal supplied to the interference signal estimator. Specifically, the one or more replication blocks may comprise at least one of a filter replication block adapted to replicate (or model) errors introduced by analogue filters, an In-phase/Quadrature-phase (IQ) modulator replication block adapted to replicate (or model) errors introduced by at least one of IQ imbalance and Direct Current (DC) offset, and a power amplifier replication block adapted to replicate (or model) errors introduced by a power amplifier.

In one implementation, the relay node is specifically adapted to transmit and receive simultaneously using proximate frequency channels (e.g., using frequency channels located within a single frequency band). In such a realization, the relay node may further comprise a frequency translator coupled between the first input of the interference signal estimator and the digital baseband processing stage. The frequency translator may be adapted to shift the transmitter baseband transmitter signal such that it reflects the difference in local oscillator frequency used for the receiver and the transmitter of the relay node.

The relay node may further comprise a measurement receiver coupled to the first input of the interference signal estimator. The measurement receiver may be adapted to generate equivalent digital baseband components of the transmitted signal. Alternatively, or in addition, the relay node may comprise a vector gain processing block coupled between an output of a power amplifier of the transmitter and an input of a radio frontend of the receiver. The vector gain processing block may be adapted to provide an at least coarse cancellation of the transmitted signal leaking back into the receiver. This may be viewed as if, e.g., one tap of an adaptive filter is implemented in the analogue domain, whereas the remaining taps of the adaptive filter are implemented in the digital domain.

The adaptation metric may generally be based on one or more items of metric information. The metric information may generally be indicative of an interference level. In this regard, the adaptation metric may, for example, be based on a Signal-to-Noise Ratio (SNR), a Bit Error Rate (BER), or a similar parameter.

The relay node may further comprise a component adapted to determine whether an increase of an amount of self-interference suppression is needed or whether self-interference suppression can be decreased, as well as a component adapted to increase or decrease, depending on the result of the determination, at least one of a transmit power of the signal transmitted from the relay node and a receive power of the relay node. Still further, a component adapted to request a decrease or increase of a transmit power of a signal received by the relay node to decrease or increase the receive power may be provided.

The interference signal estimator may be configured in various ways. In one implementation, the interference signal estimator is configured as an adaptive filter or comprises an adaptive filter. In such a realization, the relay node may further be configured to determine an amount of suppression needed and to adapt a complexity (e.g., a length) of the adaptive filter based on the amount of the suppression needed. One reason to adapt the complexity is because of power consumption. In case it suffice using a shorter filter, this is preferable because less power is consumed compared to if a longer filter would be used. Another reason to adapt the complexity might be convergence speed of the filter. Typically, a shorter filter will converge faster than a longer one. Therefore, in case the channel for the interfering signal is changing so that fast tracking of the adaptive filter is required, a less complex filter might be needed.

The interference signal estimator may comprise a first estimation block configured to estimate a blocking part and a second estimation block configured to independently estimate a co-channel interference part of the interference signal. In such an implementation, the subtractor may be configured to subtract both the estimated blocking part and the estimated co-channel interference part from the received signal.

Also provided is a method of controlling suppression of self-interference in a relay node, wherein the relay node comprises a transmitter and a receiver and wherein the relay node is adapted to transmit and receive simultaneously using the same frequency channel or using proximate frequency channels, wherein the method comprises estimating an interference signal based on a transmitter signal from the transmitter and adaptation metric, and subtracting the estimated interference signal from a received signal in the receiver so as to actively cancel a signal transmitted from the relay node that leaks back into the receiver of the relay node to suppress self-interference.

The estimating step may be performed by adaptive filtering or any other estimating approach. The complexity of the adaptive filtering (e.g., a filter length) may be adapted as needed.

The method may further comprise replicating (or modeling) errors introduced by a transmitter chain in the transmitted signal supplied to or for interference signal estimation. As an example, one or more of the following errors may be replicated (or modeled): errors introduced by analogue filters, errors introduced by at least one of IQ imbalance and DC offset, and errors introduced by a power amplifier.

In the case adaptive filtering is employed, the method may further comprise running the adaptive filtering for a predetermined amount of time, or until a termination condition has been fulfilled. In a next step one or more processing blocks in a transmitter chain or one or more blocks conveying the transmitter signal to interference signal estimation are adapted or calibrated. At this stage, the method returns to the adaptive filtering for a predetermined amount of time, or until the termination condition has been fulfilled.

The relay node may be adapted to transmit and receive simultaneously using proximate frequency channels. In such an implementation, the transmitter signal for interference signal estimation may be a transmitter baseband signal, and a method may further comprise shifting the transmitter baseband signal before interference signal estimation such that it reflects the difference in local oscillator frequency used for the receiver and the transmitter of the relay node.

The method may comprise providing a measurement receiver and generating equivalent digital baseband components of the transmitted signal by the measurement receiver. The equivalent digital baseband components of the transmitted signal may constitute the transmitter signal for interference signal estimation.

Additionally, or as an alternative, the method may further comprise providing a vector gain processing block coupled between an output of a power amplifier of the transmitter and an input of a radio frontend of the receiver. With such an implementation, the method may comprise operating vector gain processing block to provide an at least coarse cancellation of the transmitted signal leaking back into the receiver.

The step of estimating the interference signal may comprise independently estimating a blocking part and a co-channel interference part of the interference signal. Both the estimated blocking part and the estimated co-channel interference part may be subtracted from the received signal.

According to another aspect, a computer program product comprising program code portions is provided. The program code portions may be configured for performing the steps of any of the methods and method aspects disclosed herein when the computer program product is executed by a computing device, such as a processor of a relay node. The computer program product may be stored on a computer-readable recording media such as a CD-ROM, DVD-ROM, semi-conductor memory and so on. The computer program product may also be provided for download via a wired or wireless communication connection.

BRIEF DESCRIPTION OF THE DRAWINGS

Further details, aspects and advantages of the present disclosure will become apparent from the following description of exemplary embodiments in conjunction with the drawings, wherein.

DETAILED DESCRIPTION

In the following description of exemplary embodiments, for purposes of explanation and not limitation, specific details are set forth, such as specific relay node configurations and cellular network types, to provide a thorough understanding of the present disclosure. It will be apparent to one skilled in the art that the technique presented herein may be practised in other embodiments that depart from these specific details. The skilled person will appreciate, for example, that while the following embodiments will partially be described in terms as used in the Long Term Evolution (LTE) project and in particular Release 10 of the $3^{rd}$ Generation Partnership Project (3GPP) standards, according to which the physical layer processing is based on Orthogonal Frequency Division Multiplexing (OFDM), the base station is referred to as eNodeB and the user terminal is referred to as User Equipment (UE), the technique presented herein is not limited to being implemented according to any specific 3GPP or non-3GPP standard.

Moreover, those skilled in the art will further appreciate that the methods, steps and functions discussed herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores one or more programs that perform the steps discussed herein when executed by the processor.

Figure 1:
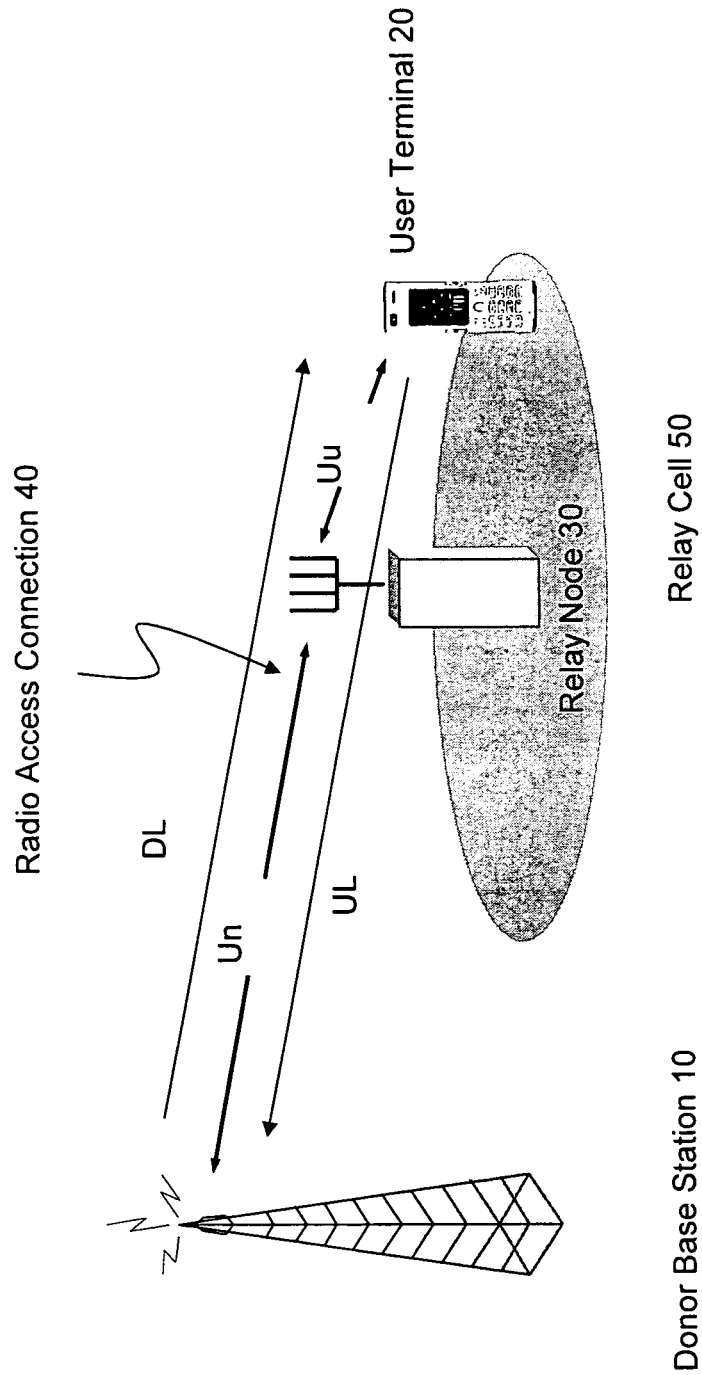
FIG. 1 schematically illustrates a portion of a cellular communication system comprising a base station, a user terminal as well as a relay node in which embodiments of the technique presented herein can be implemented.
Figure 2A:
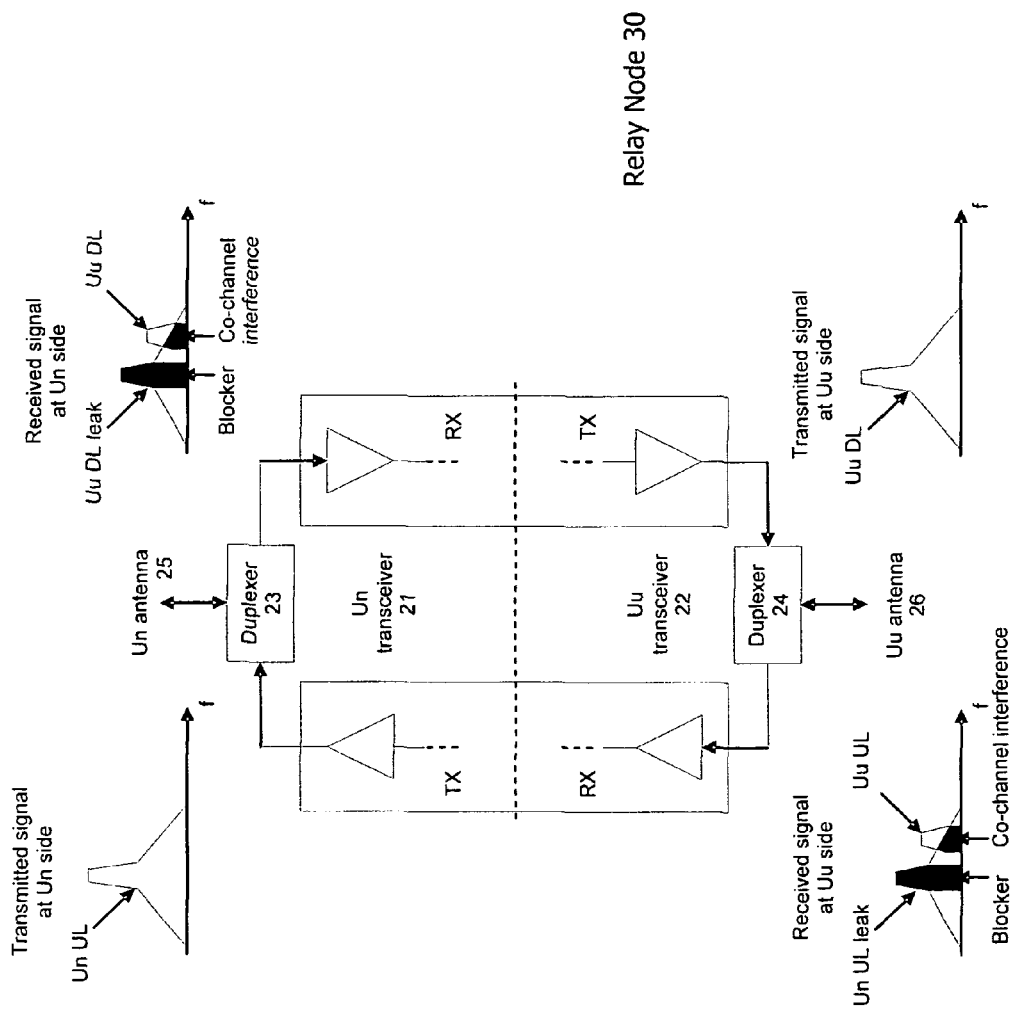
FIGS. 2A and 2B illustrates the transmitter and receiver chains of relay nodes in which embodiments of the technique presented herein can be implemented.
Figure 2B:
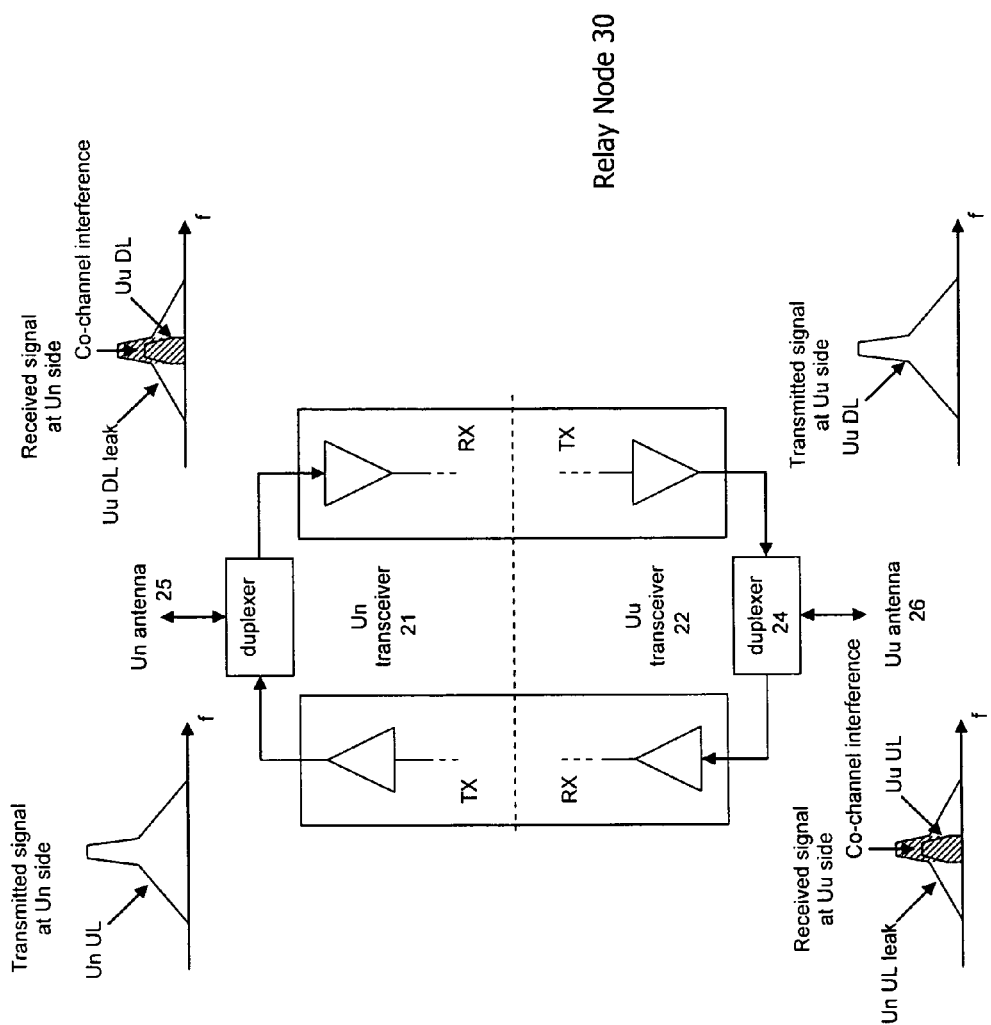

FIGS. 2A and 2B illustrates various components of a relay node 30 in which the technique presented herein may be implemented. As illustrated in FIGS. 2A and 2B, the relay node 30 comprises a first transceiver for the Un link in FIG. 1 (Un transceiver 21) as well as a second transceiver for the Uu link (Uu transceiver 22). Each transceiver 21, 22 comprises a receiver (RX) as well as a transmitter (TX). Additionally, for each of the Un transceiver 21 and the Uu transceiver 22, an associated duplexer 23, 24 coupling the respective transceiver 21, 22 to an associated antenna 25, 26 is provided.

The relay node 30 presented herein is generally configured to transmit and receive simultaneously using the same frequency channel or using proximate frequency channels. As understood in the context of the following exemplary embodiments, proximate frequency channels are generally not any further apart than what can be accommodated in a single frequency band. As understood herein, a frequency band refers to a RX and/or TX band (e.g., as specified by 3GPP). Generally, in a proximate frequency channel scenario, interference at a receiver cannot be suppressed by a duplexer or RX filter as such components only remove what is outside the respective band. In absolute numbers, the width of the frequency band, and thus the spacing of the proximate frequency channels, may vary. As an example, a bandwidth of 70 MHz is allocated for the UL and DL, respectively, in band 7 (see, e.g., 3GPP TS 36.104).

As illustrated in FIG. 2A, for proximate frequency channel operation self-interference caused by leakage of the transmitted signal into the received signal can be divided into two contributions, or parts: blocking interference ("blocker") and co-channel interference. The main lobes of the transmitter signals act as blockers that at least consume highly valuable dynamic range of the receivers or, if the blocking level is high enough, even force the receivers into compression. Due to distortion and other spectral emission contributions, the transmitter signals will broaden into the channel of the received signal, which leads to co-channel interference. Blocking interference as well as co-channel interference are schematically illustrated in the signals received by the relay node 30 at the Un side as well as the Uu side in the frequency diagrams of FIG. 2A.

FIG. 2B illustrates the self-interference situation in an operational mode in which the relay node 30 is configured to transmit and receive simultaneously using the same frequency channel. Compared to the operational mode illustrated in FIG. 2A, the blocking interference will become co-channel interference when the same channel is used for both links (e.g., when both links are based on Time Division Duplex, TDD).

Figure 3:
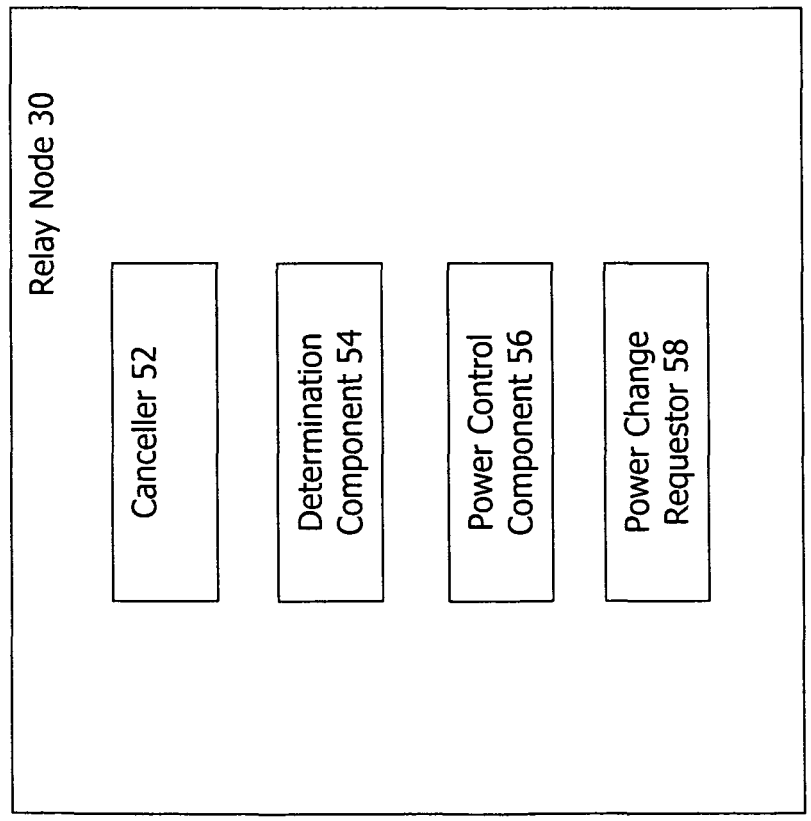
FIG. 3 illustrates an embodiment of a relay node.

The technique presented herein targets at suppressing at least one of blocking interference and co-channel interference as illustrated in FIGS. 2A and 2B, and to that end the relay node 30 as illustrated in FIGS. 1, 2A and 2B is equipped with dedicated components for controlling self-interference suppression as illustrated in FIG. 3.

FIG. 3 shows an embodiment of a relay node 30 with the components for implementing the technique presented herein. It should be noted that the relay node 30 may comprise further components, for example as illustrated in FIGS. 2A and 2B.

With reference to FIG. 3, the relay node 30 comprises a canceller 52, a determination component 54, a power control component 56 as well as an optional power change requestor 58. The canceller 52, which may be configured as an echo canceller, is adapted to actively cancel a signal transmitted from the relay node 30 that leaks into a receiver (denoted by RX in FIGS. 2A and 2B) of the relay node 30 to suppress self-interference. The canceller 52 may be based on an adaptive filter. In such a case, the relay node 30 may be further configured to determine an amount of suppression needed and to adapt a complexity of the adaptive filter based on the amount of suppression needed.

The determination component 54 is adapted to determine whether an increase of an amount of self-interference suppression is needed, or whether self-interference suppression can be decreased. The determination may be based on a quality of a signal received by the relay node 30 (e.g., in terms of a Signal-to-Noise Ratio, SNR, a Bit Error Rate, BER, or any other metric indicative of an interference level). Depending on the result of the determination by the determination component 54, and optionally depending on the available power margins, the power control component 56 increases or decreases at least one of a transmit power of the signal transmitted from the relay node 30 and a receive power of the relay node 30 (e.g., for a signal received from the base station 10 or the user terminal 20 in FIG. 1).

The power change requestor 58 is adapted to request a decrease or increase of a transmit power of a signal received by the relay node 30 so as to decrease or increase the receive power of the received signal. The transmit power of the received signal will typically be adjusted by either the base station 10 or the mobile terminal 20, so that the power change requestor 58 will communicate with either the base station 10 or the user terminal 20 when a decrease or an increase of the receive power at the relay node 30 is needed, desired or possible.

Figure 4:
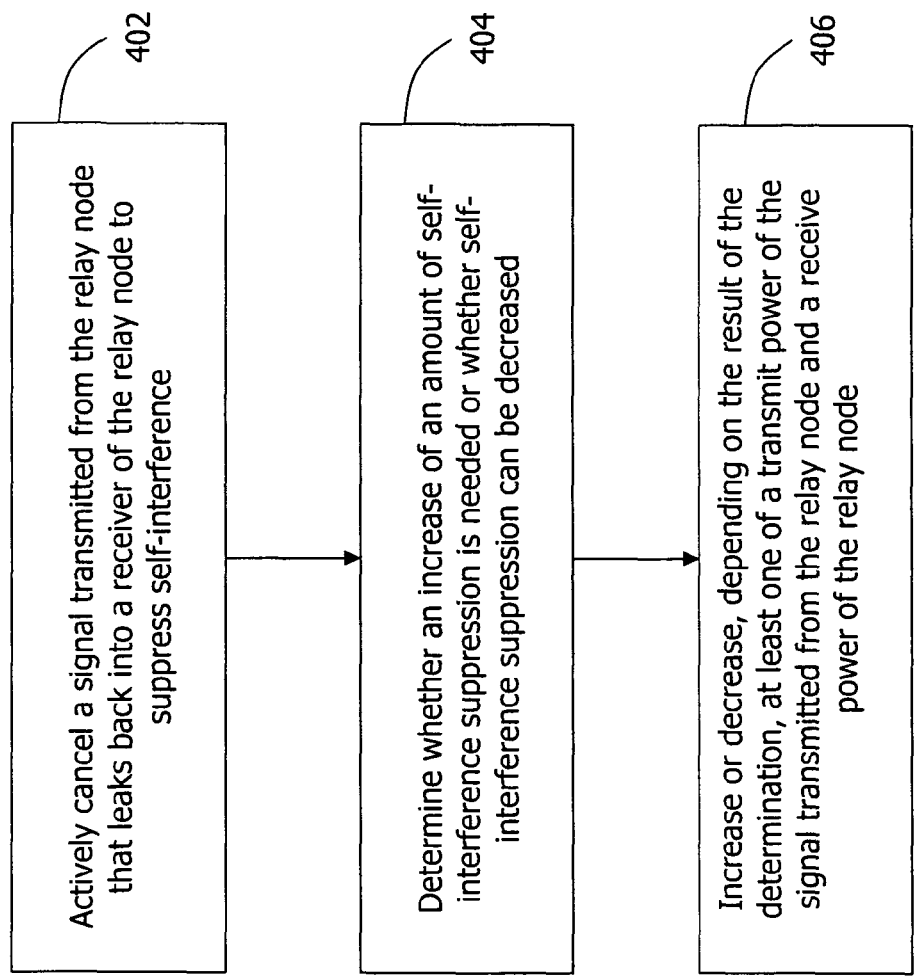
FIG. 4 is a flow diagram illustrating a method embodiment.

The operation of the relay node 30 according to an exemplary method embodiment is illustrated in the flow diagram 400 of FIG. 4.

In a first step 402, a signal transmitted from the relay node 30 that leaks back into a receiver of the relay node 30 is actively cancelled to suppress self-interference. Step 402 may be performed by the canceller 52 illustrated in FIG. 3.

In a next step 404 it is determined whether an increase of an amount of self-interference suppression is needed or whether self-interference suppression can be decreased. Step 404 may be performed by the power control component 56 illustrated in FIG. 3, optionally in cooperation with the power change component 58.

In a further step 406, a transmit power of the signal transmitted from the relay node 30 and/or a received power of the relay node 30 is increased or decreased depending on a result of the determination in step 404. Step 406 may be performed by the power control component 56 illustrated in FIG. 3.

The power control aspects described with reference to FIGS. 3 and 4 are based on the insight that there often exist power margins that can be exploited for controlling suppression of self-interference. In the following, the magnitudes of such power margins and the resulting possibilities to increase or decrease a transmit power of the signal transmitted from the relay node 30 and/or a received power of the relay node 30 will be described with reference to specific examples.

Referring to FIG. 1, it can readily be seen that a good connection between the base station 10 (e.g., an eNodeB) and the user terminal 20 (e.g., a UE) requires both that the Un link and the Uu link are good. These two concatenated links should allow for a better transmission than would be the case in the absence of the relay node 30.

Because the relay node 30 typically is stationary and favourably placed, it can use directional antennas. In particular for the backhaul link between the relay node 30 and the base station 10, the antennas can be directional since also the base station 10 is fixed. Although it might not be feasible to make the antenna in the access link between the relay node 30 and the user terminal 20 directional, it can readily be seen that it should not be omni-directional. If the relay node 30 for instance is placed indoors, the antenna might be placed in a corner at the ceiling, so that effectively it will only radiate in a limited direction.

Considering the access link more in detail, it is readily realized that the transmission power ("TX power") of the relay node 30 in the access link will largely depend on the location of the user terminal 20. Analogously, supposing the user terminal 20 transmits at maximum power irrespectively of the quality of the access link, the received signal power will also largely depend on the location of the user terminal 20.

Considering the backhaul link, and the fact that highly directional antennas might be employed, it can be expected that this link might have some margin compared to if a somewhat arbitrarily placed user terminal 20 without directional antennas would need to be supported at the same distance from the base station 10.

In the following, it is exemplarily supposed that
  the maximum TX power from the base station 10 is 43 dBm
  the maximum TX power from relay node 30 is 30 dBm
    The power in a proximate channel used by receiver is assumed to be −40 dBc (in case of proximate frequency channel operation)
  the maximum TX power from the user terminal 20 is 23 dBm
  the Noise Figure (NF) is 7 dB in all involved receivers of the relay node 30, so that the thermal noise floor is at −107 dBm/MHz
  the maximum bandwidth to be used is 20 MHz The DL will be considered first, i.e., the connection from the base station 10 to the relay node 30 and from the relay node 30 to the user terminal 20. It is supposed that the reason for including the relay node 30 is to extend the coverage, or to increase the supported data rate for a user terminal 20 at the cell edge. This could for instance mean that the relay node 30 is located in a position where the received signal level is, say, 5 dB below what is required to achieve the desired link quality. A reasonable number for the required received signal power could be −100 dBm/MHz. This corresponds to a Carrier to Noise power ratio (C/N) of 7 dB and implies that the path loss experienced for the user terminal 20 is 43 dBm−(−100 dBm)+5 dB=148 dB.

Assuming that the relay node 30 can be placed in a favourable position, and also invoking directional antennas for the backhaul link, it is supposed that the effective path loss on the Un link is 100 dB, whereas the effective path loss on the access link is 80 dB. With effective path loss it is meant that the gain obtained from directional antennas is included so that in case of omni-directional antennas, the path loss would be increased.

Clearly, in case the maximum TX power is used by both the base station 10 and the relay node 30, the received power will be 43 dBm−100 dB=−57 dBm at the relay node 30 and 30 dBm−80 dB=−50 dBm at the user terminal 20, respectively. With the assumption that −80 dBm/MHz was needed to reach an acceptable level of performance, this means that even with a 20 MHz bandwidth (13 dB), there is a power margin of −50 dBm−13 dB−(−80 dBm)=17 dB to the sensitivity level at the user terminal 20 and a power margin of −57 dBm−13 dB−(−80 dBm)=10 dB to the sensitivity level at the relay node 30. With the assumption that −100 dBm/MHz was needed to reach an acceptable level of performance, this means that even with a 20 MHz bandwidth (13 dB), there is a margin of −50 dBm−13 dB−(−100 dBm)=37 dB to the sensitivity level at the user terminal 20 and a margin of −57 dBm−13 dB−(−100 dBm)=30 dB to the sensitivity level at the relay node 30.

In one embodiment, the margins for the two links are exploited in order to simplify using proximate frequency channels or using the same frequency channel for the links by the relay node 30. Specifically, since the issue with using proximate frequency channels or the same frequency channel on the links is that the signal transmitted by the relay node 30 leaks into the receivers (denoted by RX in FIGS. 2A and 2B) of the relay node 30, the signal transmitted by the relay node 30 is reduced as much as the link margin on the Uu link allows, e.g., 10 dB or 30 dB in the examples above, whereas the transmitted power by the base station 10 is not reduced (e.g., is maintained) in order to better handle the interference situation at the relay node 30.

Considering the interference situation for the DL at the relay node 30, a reasonable attenuation from the TX antenna 26 to the RX antenna 25 (see FIGS. 2A and 2B) at the relay node 30 is 40 dB to 60 dB. Here we make the conservative assumption of 40 dB. This means that the interference power reaching the RX antenna 25 at the relay node 30 is (30 dBm−17 dB)−40 dB=−27 dBm (or −47 dBm in the other example given above), implying a C/B (Carrier to Blocker power ratio) of −30 dB (−10 dB) and C/I (Carrier to Interference power ratio) of −30 dB+40 dB=10 dB (−10 dB) at the RX antenna 25. The 40 dB in the C/I computation refers to the 40 dBc out-off-band skirts of the TX signals in the proximate frequency case (as it is distinguished here between blocking interference and co-channel interference).

In case the link margin would not have been exploited, either by allowing the base station 10 to reduce its TX power or by not reducing the TX power of the relay node 30, the C/I and C/B at the RX antenna 25 of the relay node 30 could have been tens of dB worse, i.e., C/I=10 dB−17 dB=−7 dB (or, in the other example, if a worsening of 30 dB is assumed, C/I=−40 dB). While C/I=10 dB is sufficient for correctly decoding the information for some signal formats, a C/I of −7 dB or lower (e.g., −40 dB) is more challenging. Moreover, in certain situations a C/I of −10 dB is not sufficient for correctly decoding the information, so that additional measures (such as active interference cancellation) may be employed as will be discussed below.

Next, the UL is considered, i.e., the connection from the user terminal 20 to the relay node 30 and from the relay node 30 to the base station 10. Again, it is supposed that the reason for including the relay node 30 is to extend the coverage, or increase the supported data rate for a user terminal 20 at the cell edge. Assuming the same path-loss for the UL as for the DL in the example above, the power margins obtained by invoking a relay node 30 can once again be calculated.

In case the maximum TX power is used by both the user terminal 20 and the relay node 30, the received power will be 30 dBm−100 dB=−70 dBm at the base station 10 and 23 dBm−80 dB=−57 dBm at the relay node 30, respectively. With the assumption that −100 dBm/MHz was needed, this means that even with a 20 MHz bandwidth, there is a power margin of −70 dBm−13 dB−(−100 dBm)=17 dB to the sensitivity level at the base station 10 and a power margin of −57 dBm−13 dB−(−100 dBm)=30 dB at the relay node 30. According to one embodiment, these power margins are exploited such that the relay node 30 experiences as favourable conditions as possible when it comes to self-interference. For the UL, this implies that the TX power for the backhaul link is reduced by 17 dB, whereas the TX power for the access link (the TX power by the user terminal 20) is not reduced (e.g., kept at its maximum value).

Considering the interference situation for the UL at the relay node 30, again assuming a 40 dB attenuation between the two antennas 25, 26 of the relay node 30, it follows that the interference power reaching the RX antenna 26 will be (30 dBm−17 dB)−40 dB=−27 dBm, implying a C/B of −30 dB and C/I of 10 dB (or of −30 dB in the other example) at the RX antenna 26. If the transmitter output power would not have been reduced, or if the TX power of the user terminal 20 would have been reduced, the C/I could have been tens of dB worse.

In case the relay node 30 would use different frequency channels (or even strongly different frequencies in case of a proximate frequency channel operation) for the two links (thereby allowing filtering in case strongly different frequencies were used), it is natural to not transmit at higher output power than necessary. The same is true in case the two links would use different time slots, since then interference would not be an issue. The present embodiments are therefore concerned with the situation that interference is an issue and in particular the two links are using the same or proximate frequency channels (but not necessarily the same bandwidth), and the power levels are chosen in a beneficial way to allow for this rather than on an optimal way for the individual links.

Although the introduction of the relay node 30 might significantly reduce the radio requirements, both in terms of the required transmitted power and the required sensitivity, it might in certain situations still not allow for using the same frequency channel or proximate frequency channels for the two links (at least under normal operating conditions). As indicated in the examples above, the C/I at the RX antenna might in some situations be too low.

In order to further improve the C/I for the signal that eventually enters the algorithms used for demodulation in the relay node 30, an active cancellation of the signal transmitted from the relay node 30 may be used in addition to the power control features described above. It should be noted that the active cancellation aspects described herein could also be implemented without (e.g., simultaneously) implementing the power control features presented herein, and vice versa.

In some implementations, active cancellation of self-interference can be viewed as an echo cancellation. The present disclosure is concerned with specific features of an echo canceller which will substantially improve the performance in terms of self-interference suppression. In the following embodiments, these features will exemplarily be described when the echo canceller is based on the LMS algorithm, but as will be evident for anyone with ordinary skill in the art, the features are also applicable to alternative algorithms for echo cancelling, such as for instance those based on the Recursive-Least-Squares (RLS) algorithm.

Figure 5:
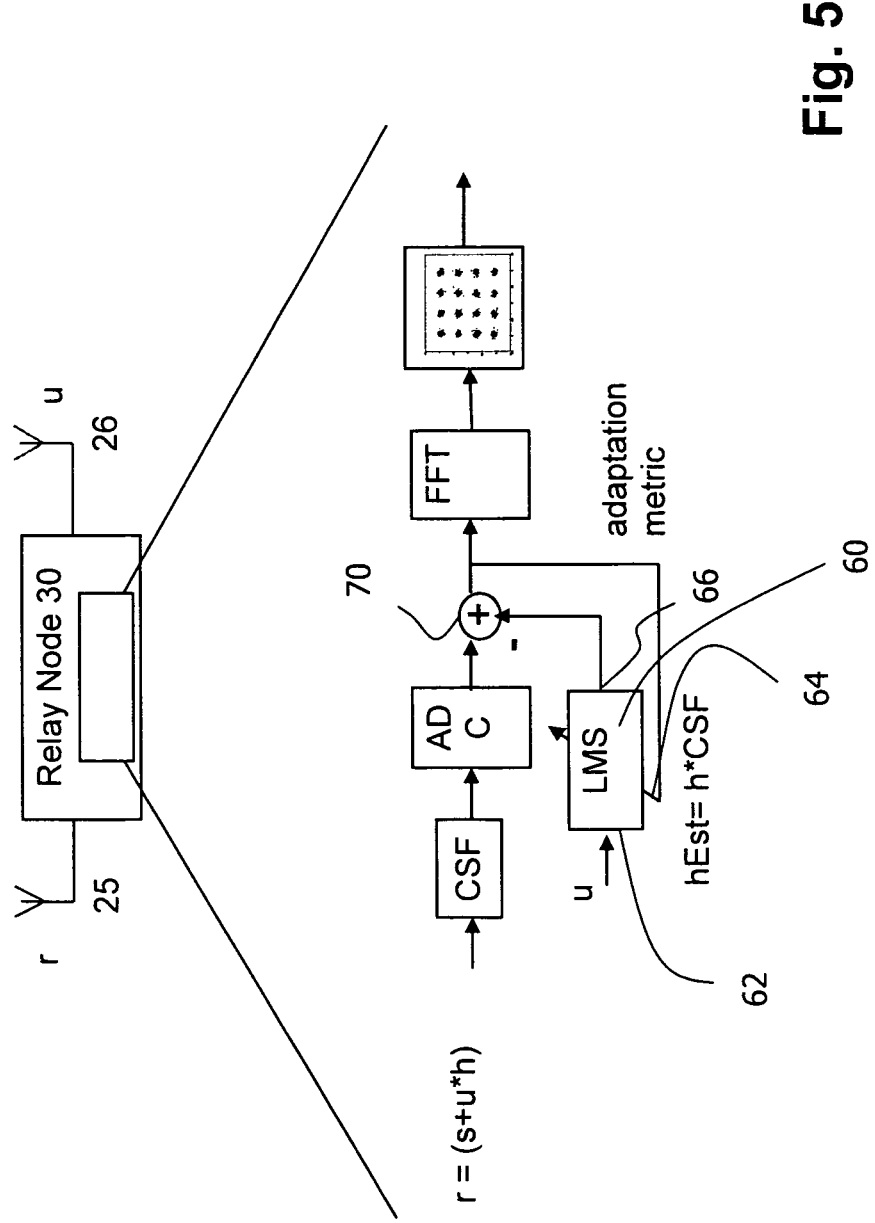
FIG. 5 illustrates a still further embodiment of a relay node.

FIG. 5 shows a further embodiment of a relay node 30 that is configured to control suppression of self-interference. FIG. 5 only shows a portion of the receiver chain of the Un transceiver 21 of FIGS. 2A and 2B. It will be appreciated that the receiver chain of the Uu transceiver 22 may have a similar configuration. It will further be appreciated that the embodiment of the relay node 30 illustrated in FIG. 5 may be supplemented with the components and functionalities discussed above with reference to the embodiments illustrated in FIGS. 3 and 4.

As shown in FIG. 5, the receiver chain of the relay node 30 comprises a Channel Selective Filter (CSF), an Analogue-to-Digital Converter (ADC) and digital baseband processing components. In the embodiment of FIG. 5, the digital baseband processing components are merely exemplified by a Fast Fourier Transform (FFT) block and the result of the demodulation illustrated by an IQ diagram In practice, the digital baseband will contain blocks (not shown in FIG. 5) for parameter estimation, for estimating parameters like time, frequency, and channel parameters. The digital baseband will also contain blocks (not shown in FIG. 5) for channel equalization and decoding both concerning the control and data channels.

The relay node 30 further comprises an interference signal estimator 60 having a first input 62 adapted to receive the transmitter signal u from the transmitter (denoted by TX in FIGS. 2A and 2B), a second input 64 configured to receive adaptation metric, and an output 66 adapted to output an estimated interference signal generated by the interference signal estimator 60 based on the transmitter signal u and the adaptation metric. In the present embodiment, the interference signal estimator 60 is an adaptive filter that is based on the LMS algorithm. The adaptation metric may be indicative of the prevailing interference situation.

The relay node 30 also comprises a subtractor 70 coupled to the output 66 of the interference signal estimator 60 and configured to subtract the estimated interference signal from a received signal in the receiver of the relay node 30. In this way, a signal transmitted from the relay node 30 that leaks back into the receiver of the relay node 30 is actively cancelled so as to suppress self-interference. In the specific embodiment of FIG. 5, the subtractor 70 is configured as an adder and a sign inverter coupled before the adder.

Figure 6:
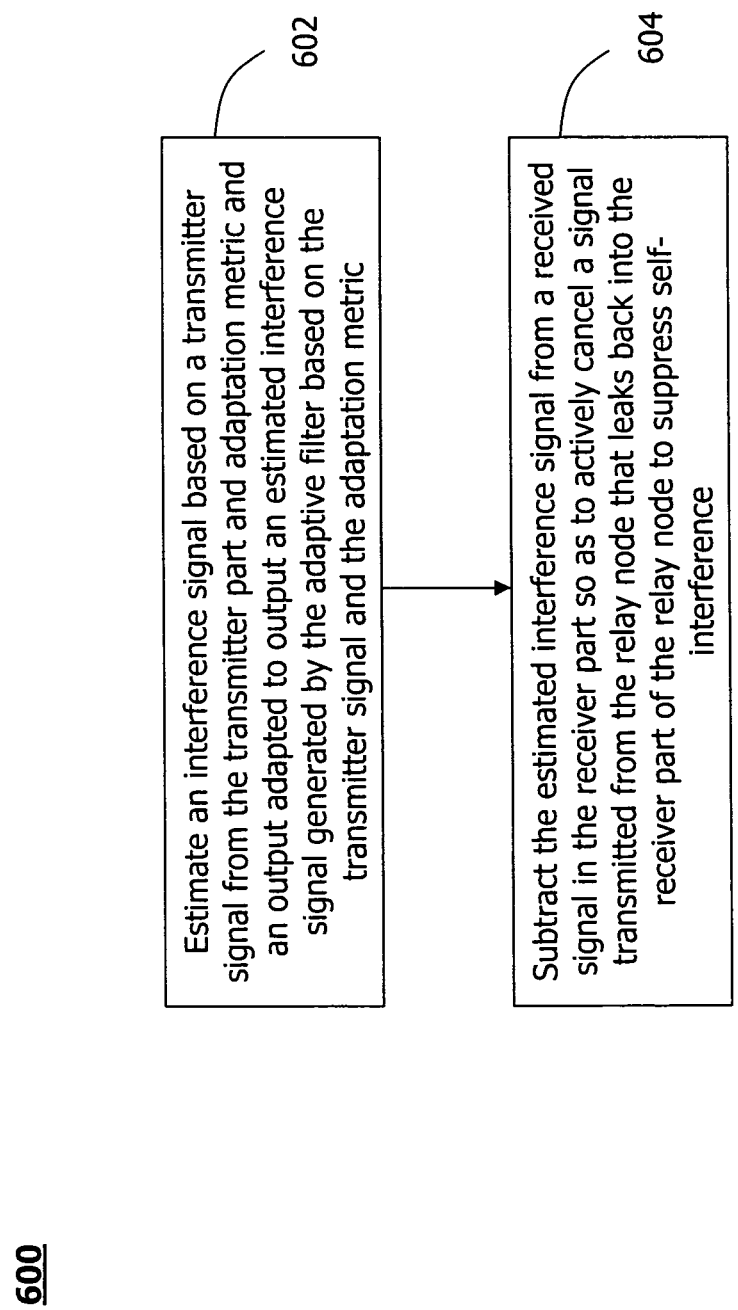
FIG. 6 is a flow diagram illustrating another method embodiment.

In FIG. 6 a flow diagram 600 is depicted that illustrates in a method embodiment operation of the relay node 30 shown in FIG. 5. In a first step 602, an interference signal is estimated based on a transmitter signal from the transmitter and based on adaptation metric. Step 602 may be performed using the interference signal estimator 60 of FIG. 5.

The adaptation metric may be indicative of the success of self-interference suppression and may thus be used in the context of self-interference suppression control. If, for example, self-interference suppression is based on an adaptive filter, the adaptation metric may become smaller the better the adaptive filter is converging. Accordingly, the adaptation metric may be generated based on a processed signal from which the (estimated) interference has been subtracted. In general, the adaptive filter will converge, so that the filter coefficients are similar to the channel through which the interfering signal has leaked. The interference signal may be estimated by filtering the transmitted signal through the adaptive filter. Thus, the interference situation may be estimated based on the transmitted signal and the filter coefficients in the adaptive filter.

In a further step 604, the estimated interference signal is subtracted from a received signal in the receiver so as to actively cancel a signal transmitted from the relay node 30 that leaks back until the receiver of the relay node 30. In this manner, self-interference can be suppressed. Step 604 may be performed using the subtractor 70 illustrated in FIG. 5.

As shown in FIG. 5, the received signal r consists of the desired signal s coming from the base station 10, and the interference which is the signal u transmitted by the relay node 30 convolved with the impulse response h of the channel between the two antennas 25, 26. The received signal r is filtered through the CSF, and then digitized in the ADC for further processing in the digital baseband domain.

The reception is assumed to be performed according to prior art, and what is of particular interest here is how the effect of the interfering signal is reduced. Referring to FIG. 5, the LMS algorithm is used to estimate the interference to be subtracted. Since the transmitted signal is known, the interference will be removed when the filter taps in the LMS algorithm correspond to the channel between the antennas 25, 26 plus other effects in the transmitter and receiver chains. In the specific embodiment of FIG. 5, these effects are assumed to all be in the CSF.

Figure 7:
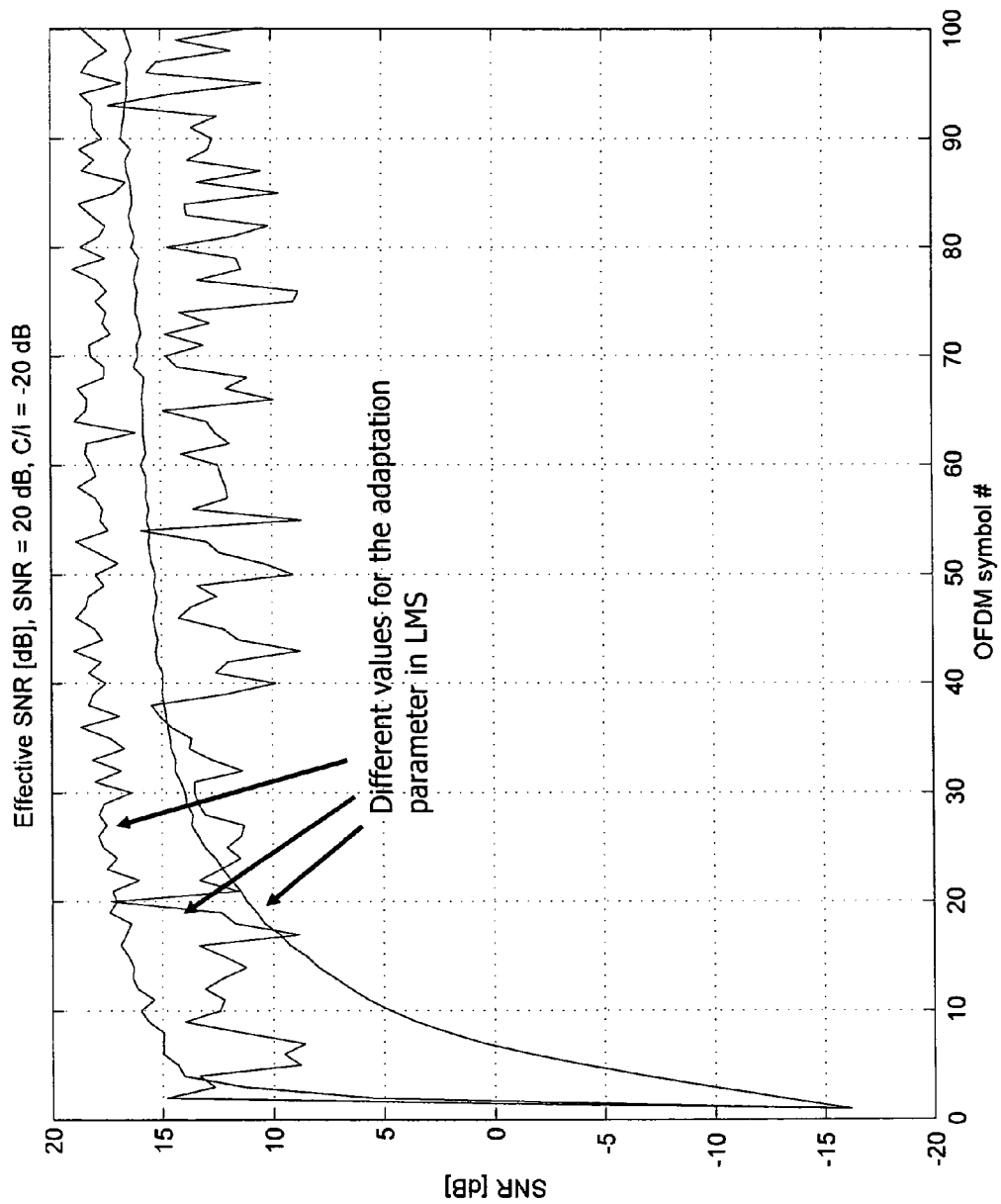
FIGS. 7-10 are diagrams illustrating variation of the effective SNR dependent on filter adaptation according to embodiments of the present disclosure.

An example of how active cancellation of the self-interference can improve the quality of the received signal is depicted in the diagram of FIG. 7. FIG. 7 shows simulations of how the effective SNR in the IQ diagram varies as the LMS algorithm adapts.

The simulations of FIG. 7 were done for the DL of LTE, which uses OFDM. The LMS algorithm updates the channel estimate for every OFDM symbol, but not within an OFDM symbol. The (adaptation) metric used to judge the performance of the LMS algorithm is the SNR in the IQ diagram as will be described below. Another metric could have been used instead, and the choice of metric is not essential for the invention but merely used to more easily illustrate the invention. In the simulations, the desired signal is only affected by additive white Gaussian noise (AWGN) and the time and frequency estimation are assumed to be ideal. In practice, there will also be channel estimation etc. for the desired signal, but this is not relevant to describe the essence of the technique presented herein.

With an ideal receiver for the desired signal, the SNR obtained in the IQ diagram will be determined only by the AWGN in case the interference would be perfectly cancelled. With non-ideal cancellation, the SNR in the IQ diagram will be a good measure of how much of the interference remains after cancellation has taken place. Thus, an upper bound for what can be achieved is given by the SNR.

Referring to FIG. 7, the SNR is 20 dB, and it can be seen that the LMS algorithm can improve the performance from −20 dB (which is C/I without cancellation) to 17 to 18 dB with a suitable choice of an adaptation parameter in the LMS algorithm. In this case C/I=−20 dB at the input to the LMS algorithm.

Figure 8:
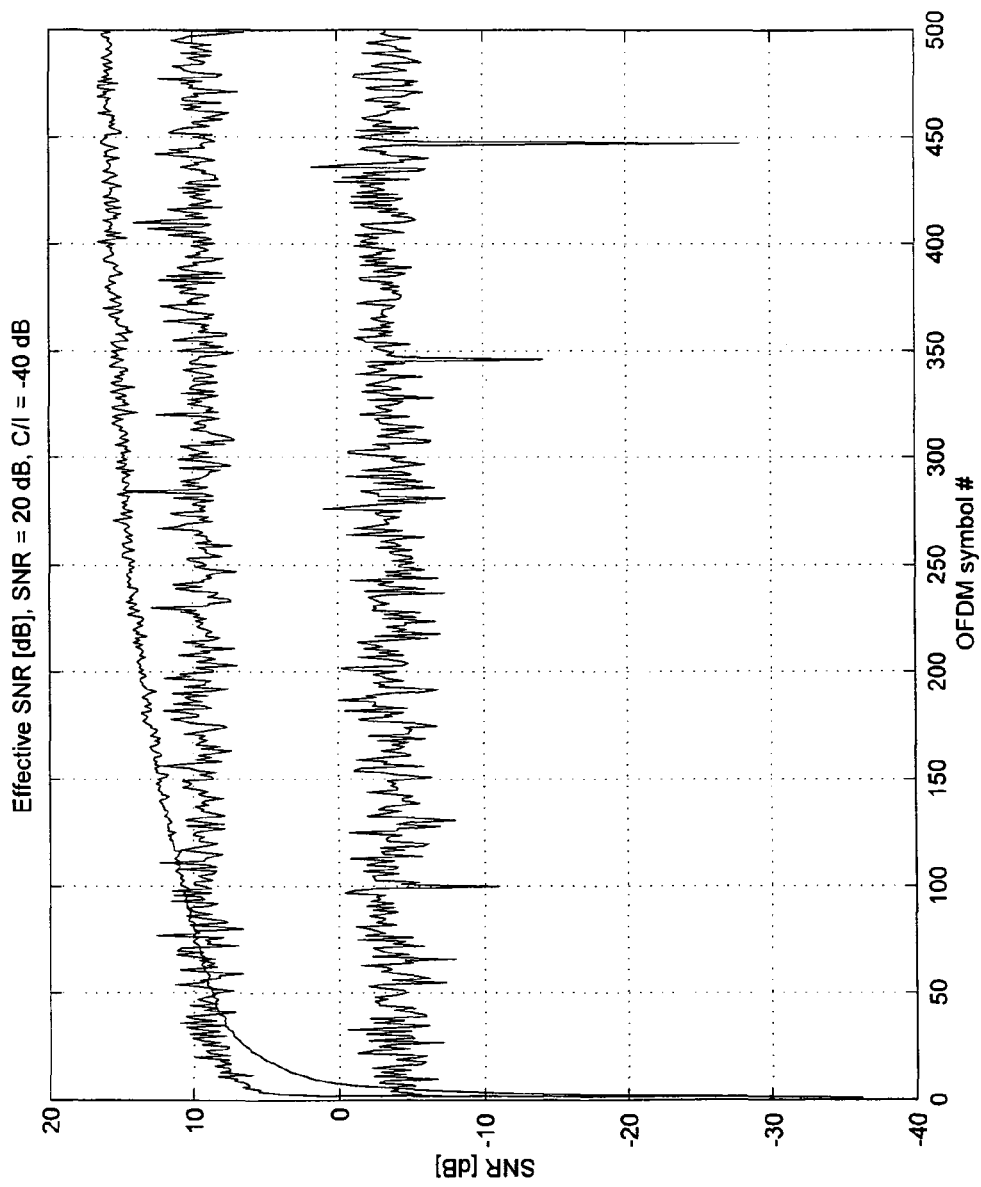

In the diagram of FIG. 8, the C/I at the input to the LMS algorithm is −40 dB. As can be seen, in order to reach a SNR in the range of 15 dB, the LMS algorithm needs to be updated using very small steps. This need in turn implies that the convergence will be substantially slower.

In FIGS. 7 and 8, the channel model for the leakage between the two antennas 25, 26 of the relay node 30 was an exponentially decaying channel with an RMS delay spread of 10 ns. For the case of C/I=−20 dB (see FIG. 7), the LMS algorithm was used with a filter of length 5, i.e., the channel response was estimated by a filter with 5 taps sampled at 30.72 MHz. This was sufficient to suppress the interference with roughly 37 to 38 dB (C/I improved from −20 dB to around 18 dB). For the case when C/I=−40 dB at the input to the LMS algorithm (see FIG. 8), it was found that 5 taps did not suffice to come close to the ideal SNR=20 dB in the IQ diagram. Instead, the number of taps used for estimating the channel was increased to 15, which is what has been used for the simulations of FIG. 8.

The need for more taps when needing to suppress interference with a larger amount can be explained by the fact that the channel simply needs to be estimated more accurately. The slower convergence can at least partly be explained by the fact that a more complex (longer) filter is required to reach the desired suppression. In one embodiment, the complexity of the algorithm for interference cancellation is therefore adapted based on the amount of suppression needed.

Since the relay node 30 typically is stationary, the channel variations can be expected to only be minor. Therefore, an increase or decrease in the amount of suppression needed can to a large extent be based on a corresponding increase or decrease in the transmit power, or a decrease or increase in the receive power. Specifically, if it is found that the suppression is not sufficient, the relay node 30 may request the base station 10 to increase its transmit power (so that the receive power at the relay node 30 is increased also). If that is not possible, or the increase is not sufficient, the relay node 30 may itself decrease the transmit power used for the Uu link. The latter might typically imply that the supported data rate is reduced correspondingly.

In another embodiment, the fact that a shorter filter used for estimating the channel will converge faster is exploited. Specifically, when channel variations are detected (for instance based on the fact that taps in the filter change more rapidly or indirectly from that fact that the interference level in the demodulation process is increased), the complexity of the filter adapted by the LMS algorithm is reduced in order to speed up the tracking performance. Then, when the taps in the filter start to change more slowly, the number of taps in the filter might again, if found necessary, be increased to allow for increased suppression.

To be able to suppress the interference, it is desirable that the interfering signal does not cause any degradation before it can be subtracted. One requirement is, for instance, that the interferer does not saturate the ADC. In the scenarios of FIGS. 7 and 8 above, the simulations were performed with a floating point implementation. Clearly, the requirements on the ADC might be unreasonable if the C/I at the antenna is too low.

Figure 9:
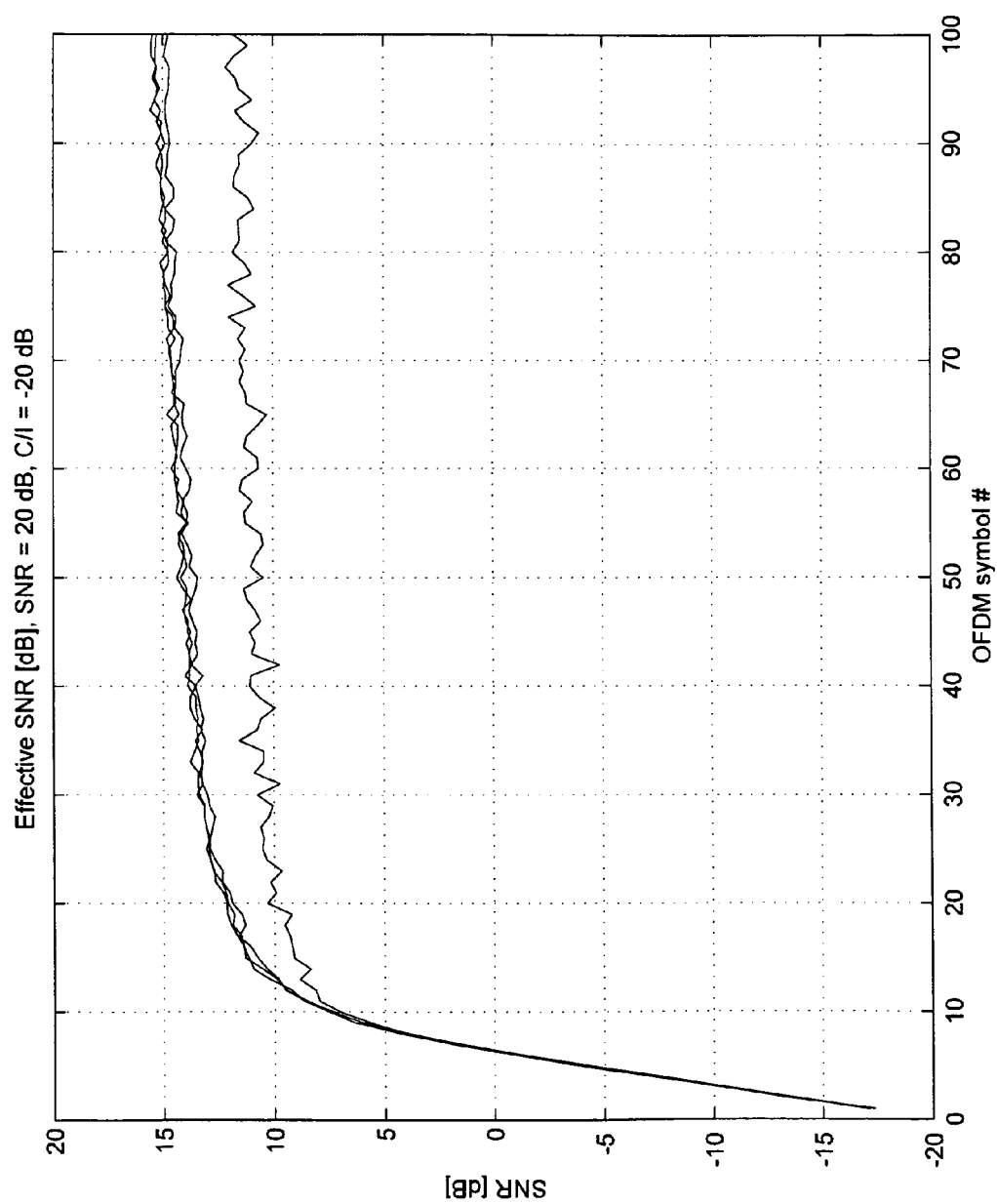
Figure 10:
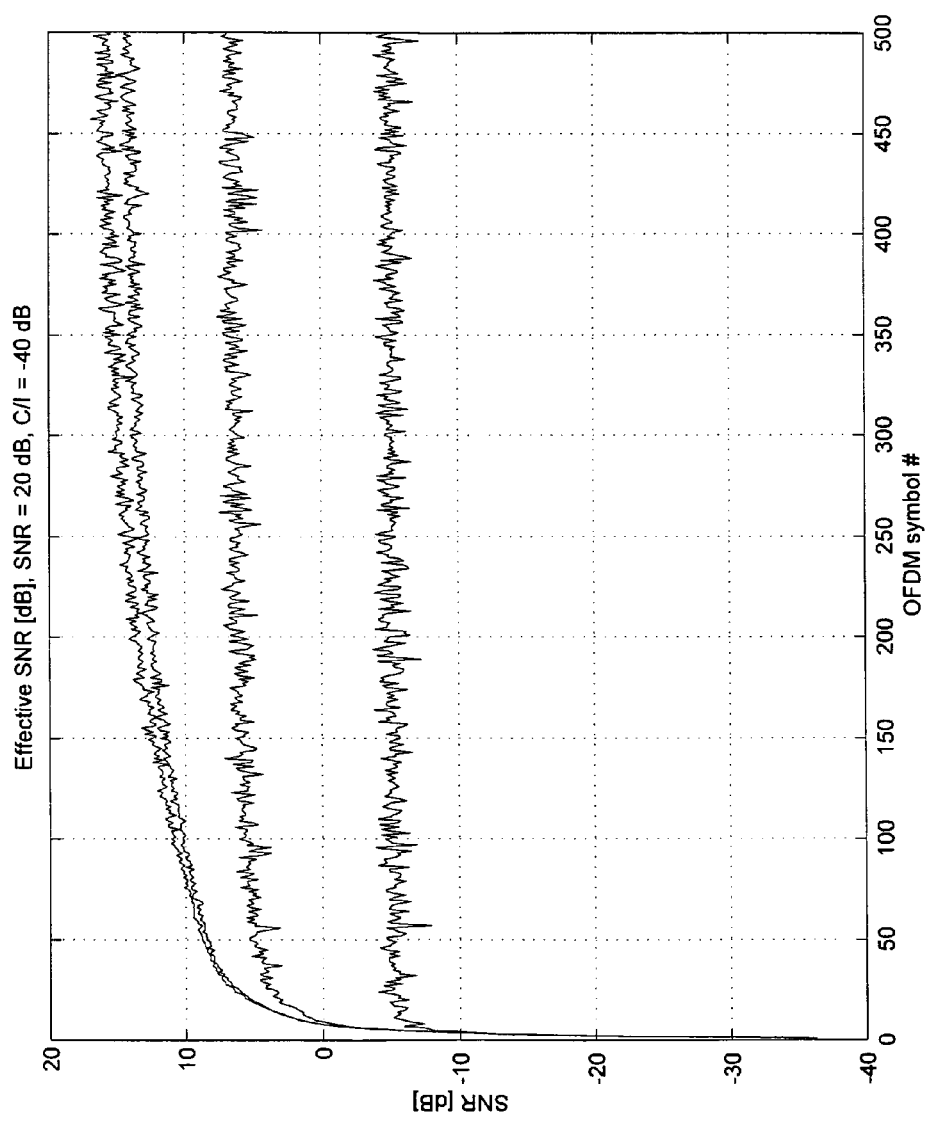

In FIGS. 9 and 10, the effect of a limited resolution in the ADC is shown. In both figures, there are four lines corresponding to floating point operation (the best performance) and an ADC with 10, 8, and 6 bits each in I and Q (decreasing downwards). As can be seen, in case C/I=−20 dB, 8 bits suffice, whereas using only 6 bits gives a noticeable degradation. It should be emphasized that this degradation is not due to the fact that the LMS algorithm does not work, it is due to the dynamic range of the ADC (to a too large extent) being needed for the interferer, so that the desired signal will experience increased quantization noise. When instead C/I=−40 dB, it can be seen that not even 10 bits are sufficient. Since all these simulations are generated assuming that the ADC is used optimally (full range is used but no clipping), in a practical situation where Automatic Gain Control (AGC) is used to control the signal level into the ADC, it can be expected that at least 1-2 more bits are needed.

When trying to suppress the interference with as much as, for example, 40 dB, there are also practical issues to be addressed, as will now be explained with reference to the relay node embodiments of FIGS. 11 to 17. The following embodiments will focus on the DL operation of the relay node 30, which involves the receiver of the Un transceiver 21 as well as the transmitter of the Uu transceiver 22 in FIGS. 2A and 2B. It will be readily apparent that similar operations as discussed hereinafter could be carried out by the relay node 30 in the UL direction. Moreover, it will be readily apparent that the embodiments described hereinafter may be readily combined with the power control features discussed above with reference to the embodiments illustrated in FIGS. 3 and 4. In the following description, similar components will be denoted with the same reference numerals.

In the discussion of the diagrams of FIGS. 7 to 10, that substantially referred to the relay node embodiment of FIG. 5, it was assumed that the interference could be modeled as the transmitter (baseband) signal u passing through an interference signal estimator using, for example, the LMS algorithm. While the self-interference cancellation is based on the transmitter signal as known in the digital domain (u), the actual signal being coupled to the RX antenna will differ quite substantially (e.g., with error contributions of some −35 to −40 dBc) due to accumulation of various non-ideal properties of the transmitter chain. To discuss these non-ideal properties further, FIG. 11 illustrates a more detailed embodiment of the relay node 30 that is based on the embodiment of FIG. 5.

Figure 11:
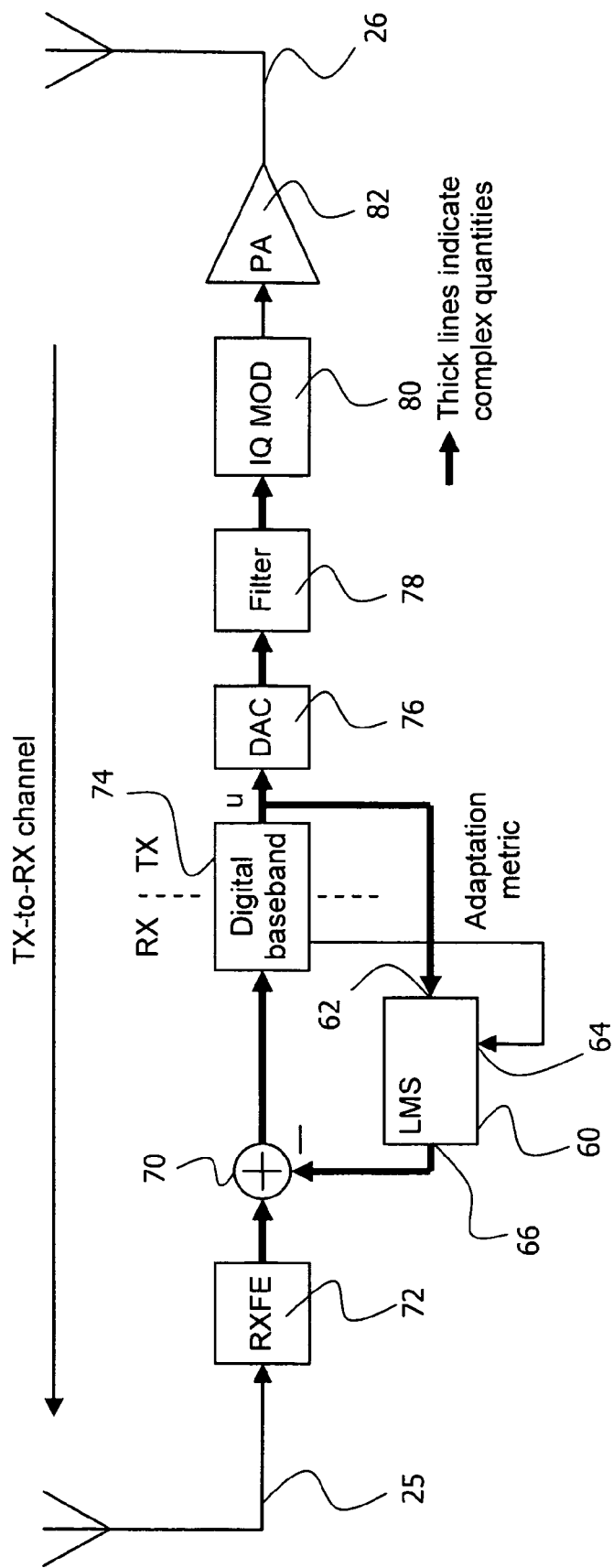
FIGS. 11-18 illustrate further embodiments of relay nodes.

As illustrated in FIG. 11, the relay node 30 comprises an interference signal estimator 60 and a subtractor 70 in the receiver chain as discussed with respect to FIG. 5. Additionally, a radio front end 72 coupled between a Un antenna 25 and the subtractor 70 in the receiver chain is provided. The radio front end 72 may comprise the CSF and ADC shown in FIG. 5. The receiver chain further comprises a digital baseband processing stage 74 that stretches into the transmitter chain. The digital baseband processing components of the receiver chain may comprise the FFT and the demodulator illustrated in FIG. 5.

The transmitter chain of the relay node 30 comprises a digital-to-analogue converter (DAC) 76, one or more analogue filters 78, an IQ modulator 80 as well as a power amplifier 82 that is coupled to a Uu antenna 26.

Figure 12:
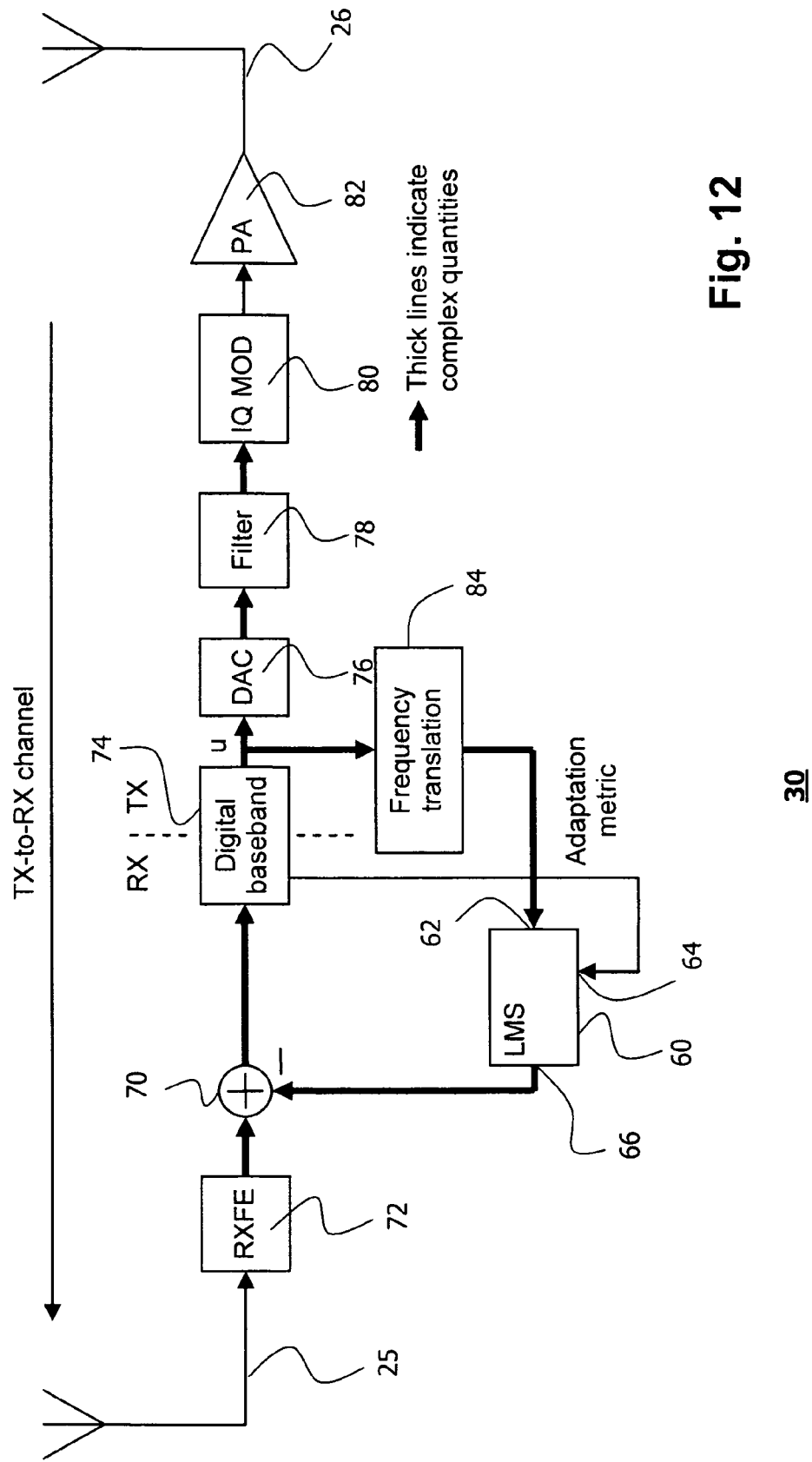

In the embodiment of the relay node 30 illustrated in FIG. 12 corresponds to the embodiment of FIG. 11 but while the embodiment of FIG. 11 is provided for transmitting and receiving using the same frequency channel, the embodiment of FIG. 12 is provided for proximate frequency operation. Before entering the interference signal estimator 60, the transmitter signal will in the case of proximate frequency channel operation be passed through an optional frequency translation block 84 (not illustrated in FIG. 5). The purpose of the frequency translation block 84 is to shift the transmitter signal u such that it reflects the difference in Local Oscillator (LO) frequency used for the receiver and transmitter in case of proximate frequency channel operation.

In the embodiment illustrated in FIG. 12, the digital baseband representation of the transmitter signal u would have no or very little co-channel interference contribution to the channel of the received signal r unless there was an overlap between the transmitter and receiver channel. The (only) benefit from the architecture in FIG. 12 would be the reduction of the blocking level. Any block in the receiver after the subtraction of the transmitter signal estimate by the subtractor 70 would thus benefit from reduced dynamic range requirements.

Regarding the embodiments of FIGS. 11 and 12, the DAC operation can be assumed to provide insignificant levels of errors, especially compared to the filters 78 that follow and that introduce a droop and possibly in-band ripple. By itself, this might not contribute to new spectral emissions, but altering the transmit signal will have implications on the distortion generated later in the transmitter chain. Also, the filters 78 may introduce significant frequency-dependent IQ imbalance and DC offset.

The quadrature modulator 80 will also introduce IQ imbalance and DC offset, but typically not with a frequency dependency up to the extent of the filters 78. Furthermore, the power amplifier 82 will produce a significant amount of in-band as well as out-of-band non-linear distortion to be able to operate with reasonable power efficiency.

These errors can to some extent be mitigated by compensation in the digital baseband domain and/or, in some cases, by calibration of the blocks in the transmitter chain, in particular of the quadrature modulator 80. Thus, if the capability of the interference signal estimator 60 and subtractor 70 is such that the leakage between the antennas 25, 26 can be suppressed below the levels of errors introduced in the transmitter chain, then these errors must be modelled, or replicated, to obtain a more accurate estimate of the signal actually being transmitted. Alternatively, or in combination with such replication, some blocks of the relay node 30 may be calibrated to remove the "initial" errors as discussed above.

Figure 13:
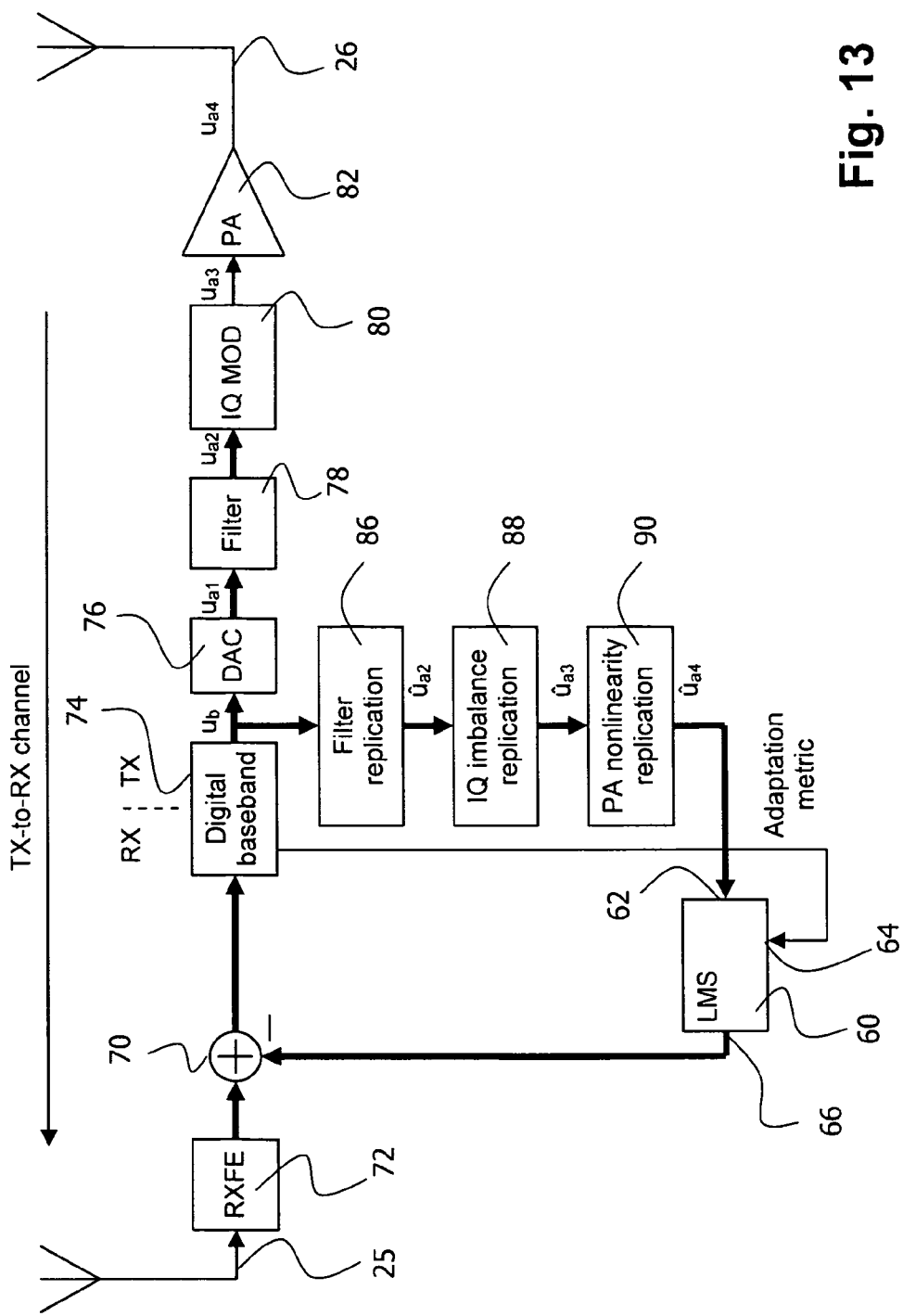

In the embodiment illustrated in FIG. 13, the errors introduced in the transmitter chain are replicated, or modelled, in the digital baseband domain to obtain a better estimate of the transmitter signal u. To this end, three replication blocks 86, 88, 90 are provided that correspond to the blocks 78, 80, 82, respectively, in the transmitter chain. It will be understood that any number of replication blocks can be used to reflect the actual transmitter chain architecture (and the errors introduced by that particular architecture) to reach the required level of self-interference suppression. Accordingly, one or more of the three blocks 86, 88, 90 illustrated in FIG. 13 may be omitted, and additional blocks could be added.

The purpose of the replication blocks 86, 88, 90 is to model the errors that cause self-interference. Thus, the complexity of the models can be simplified by considering that only errors within the channel of the received signal need to be accurately modelled. Furthermore, it may be sufficient to have static models in some cases, whereas the models may need to be adaptive in other cases.

As for the filter replication block 86, digital replication of analogue filters is straight-forward when the characteristics of the analogue filters are known with sufficient accuracy. Analogue filters are typically of low order, which implies that there are only a few numbers of coefficients to alter if the digital replication filter in the block 86 needs to be adapted. In case there is a significant imbalance between the I and Q filters of the IQ branches, the filter replication block 86 may be split in two filter blocks, that are configured and/or adapted independently.

As for the IQ imbalance replication block 88, digital replication of the quadrature modulator 80 includes modelling of IQ phase and gain imbalance as well as modelling of DC offset (or LO leakage). Modelling and adaptation of IQ imbalance and DC offset are as such known in the art.

Regarding the replication block 90 tackling power amplifier non-linearities, it is known that the power amplifier 82 is more or less non-linear and may also exhibit memory effects that further complicate replication. Nevertheless, those skilled in the art of behavioural modelling of power amplifiers and/or of linearizing of power amplifiers know that there are many of models and means for adaptation with various degrees of complexity that can be used to replicate and track the behaviour of the power amplifier 82.

A low order polynomial that models the (memoryless) complex-valued baseband equivalent of the power amplifier 82 is one of the simplest models that can be envisioned. Yet it may model distortion within the frequency band of interest accurate enough to allow for another 10 to 20 dB improvement in self-interference suppression. In case adaptation is required, a simple model with a few parameters is preferred, as it allows for faster convergence than with models based on many parameters (and intricate relations).

Figure 14:
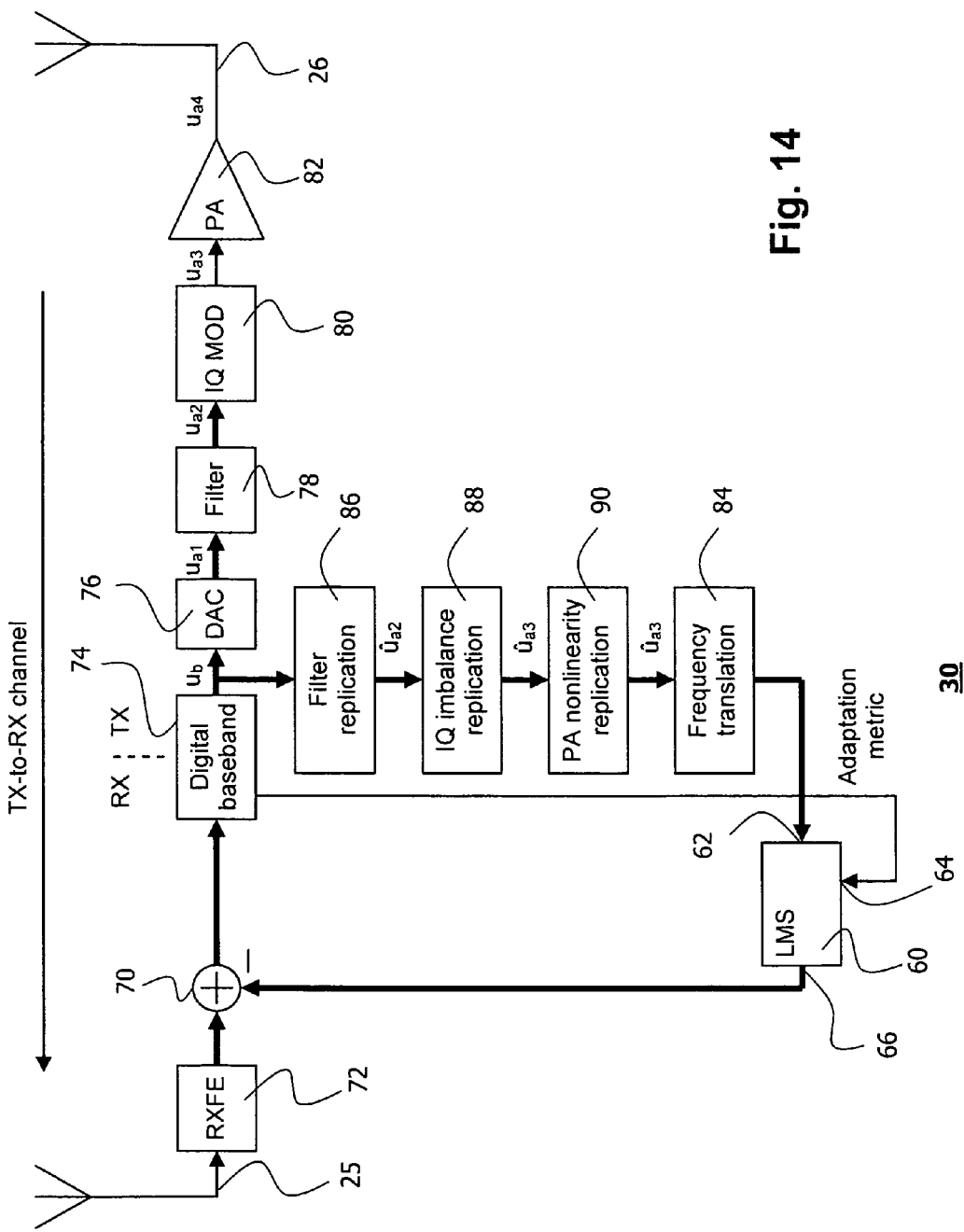

The embodiment of the relay node 30 illustrated in FIG. 14 is based on the embodiment of FIG. 13 and additionally comprises the frequency translation block 84 discussed above with reference to FIG. 12. Accordingly, while the relay node 30 illustrated in FIG. 13 is adapted to transmit and to receive simultaneously using the same frequency channel, the relay node 30 of FIG. 14 may use proximate frequency channels in this regard.

Figure 15:
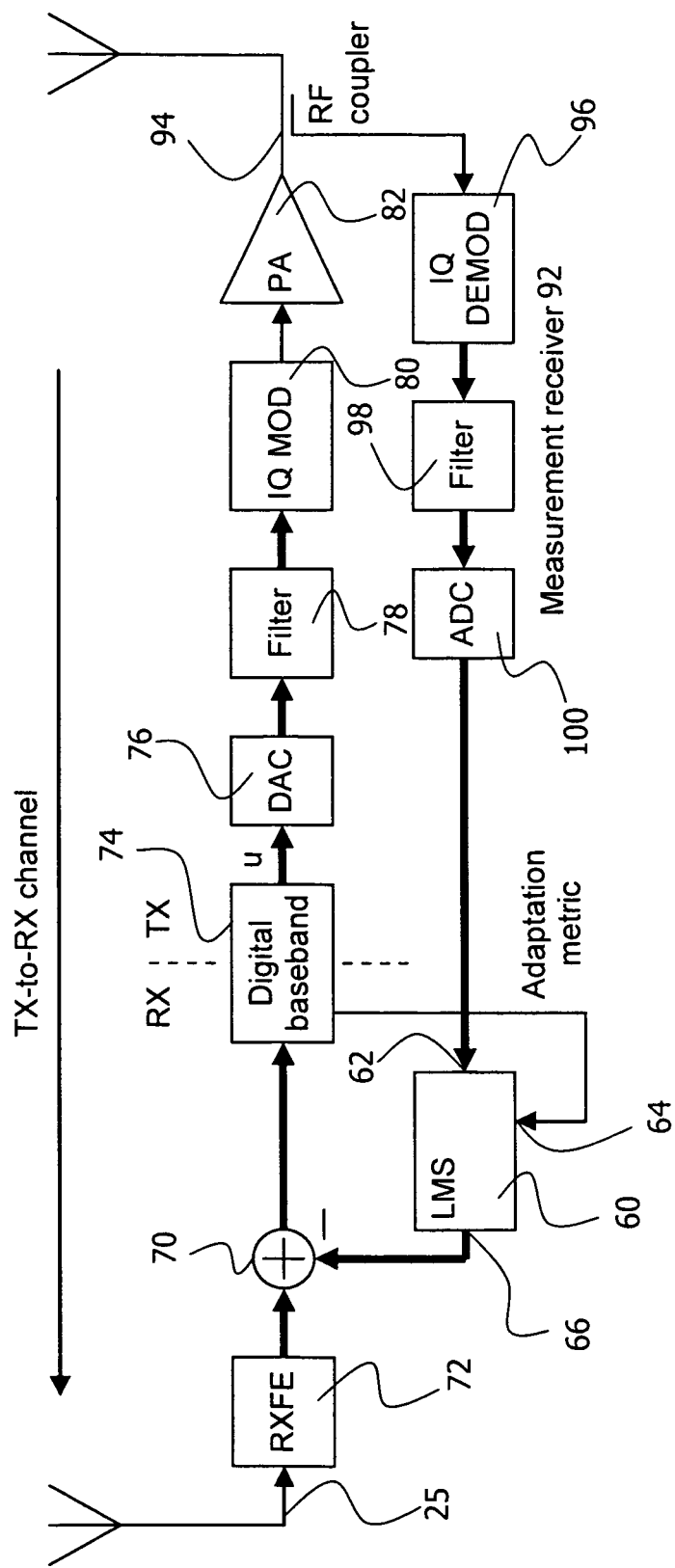

FIG. 15 shows another embodiment of a relay node 30. In the embodiment of FIG. 15, the relay node 30 is provided with a measurement receiver 92. The transmitted RF signal is coupled to the measurement receiver 92 via an RF coupler 94 (using the LO frequency of the main receiver, and not that of the transmitter). The measurement receiver 92 is adapted to generate equivalent digital baseband components of the transmitted signal. To this end, the measurement receiver 92 comprises an IQ demodulator 96, one or more analogue filters 98 as well as an ADC 100. The output signal of the ADC 100 will be supplied as the transmitter signal to the input 62 of the interference signal estimator 60.

With the architecture illustrated in FIG. 15, the non-ideal behaviour of the measurement receiver 92 may be a limiting factor. While there is no non-linearity problem with the power amplifier 82 (as the measurement receiver captures what is actually being transmitted), the IQ demodulator may introduce a IQ imbalance and a DC offset.

FIGS. 11 to 15 exemplify relay node architectures for obtaining an estimate of the transmitted signal to be used for self-interference suppression. Other architectures can be envisioned in which the transmitter signal is taken from another node within the transmitter chain with the corresponding need for replication. For example, the RF output signal from the IQ modulator 80 could be used instead of the output signal from the power amplifier 82 as illustrated in FIG. 15. In such an implementation, only the power amplifier non-linearity would have to be replicated.

Figure 16:
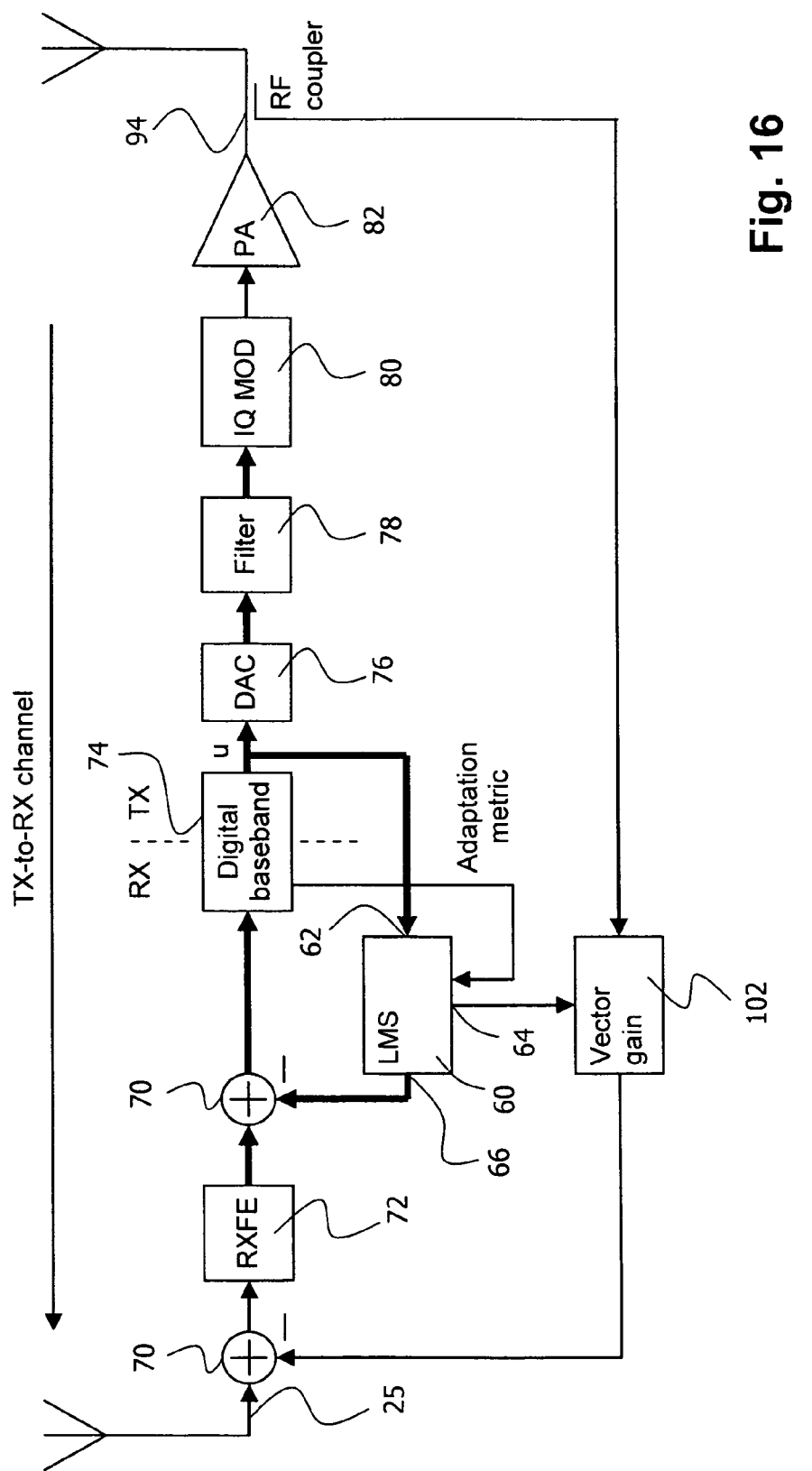

In yet another embodiment of the relay node 30 illustrated in FIG. 16, the transmitted signal is not down-converted but instead kept in the RF domain and input to a vector gain processing block 102. The vector gain operation (a complex gain or corresponding amplitude gain and phase shift) performed by the vector gain processing block 102 is intended to provide a first coarse self-interference cancellation already before the RF receiver frontend 72. Here it is assumed that the channel has one dominant tap for the interference suppression scheme to be effective.

The approach illustrated in FIG. 16 has the advantage of decreasing the dynamic range requirements in the analogue receiver domain (radio front end 72) from a Low Noise Amplifier (LNA) all the way to the ADC. The remaining interference may be handled in the digital baseband domain using any of the previous approaches in terms of where to tap the transmitter chain for the transmitter signal to be input to the interference signal estimator 60.

Figure 17:
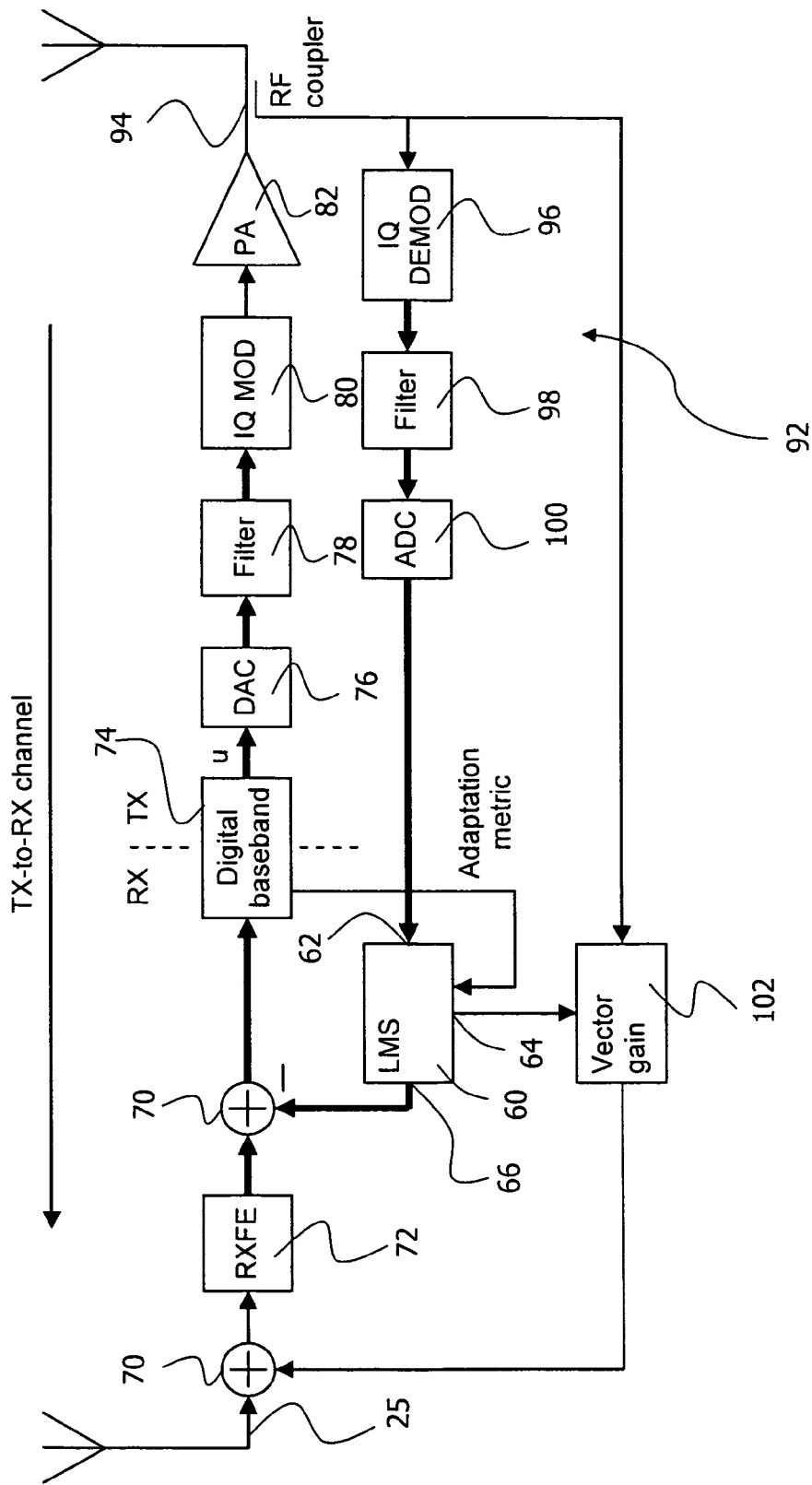

An alternative architecture based on such a concept is illustrated in FIG. 17. In the embodiment of the relay node 30 illustrated in FIG. 17, the output signal of the power amplifier 82 is used both for a first coarse cancellation at the LNA input as well as a further cancellation in the digital domain.

Figure 18:
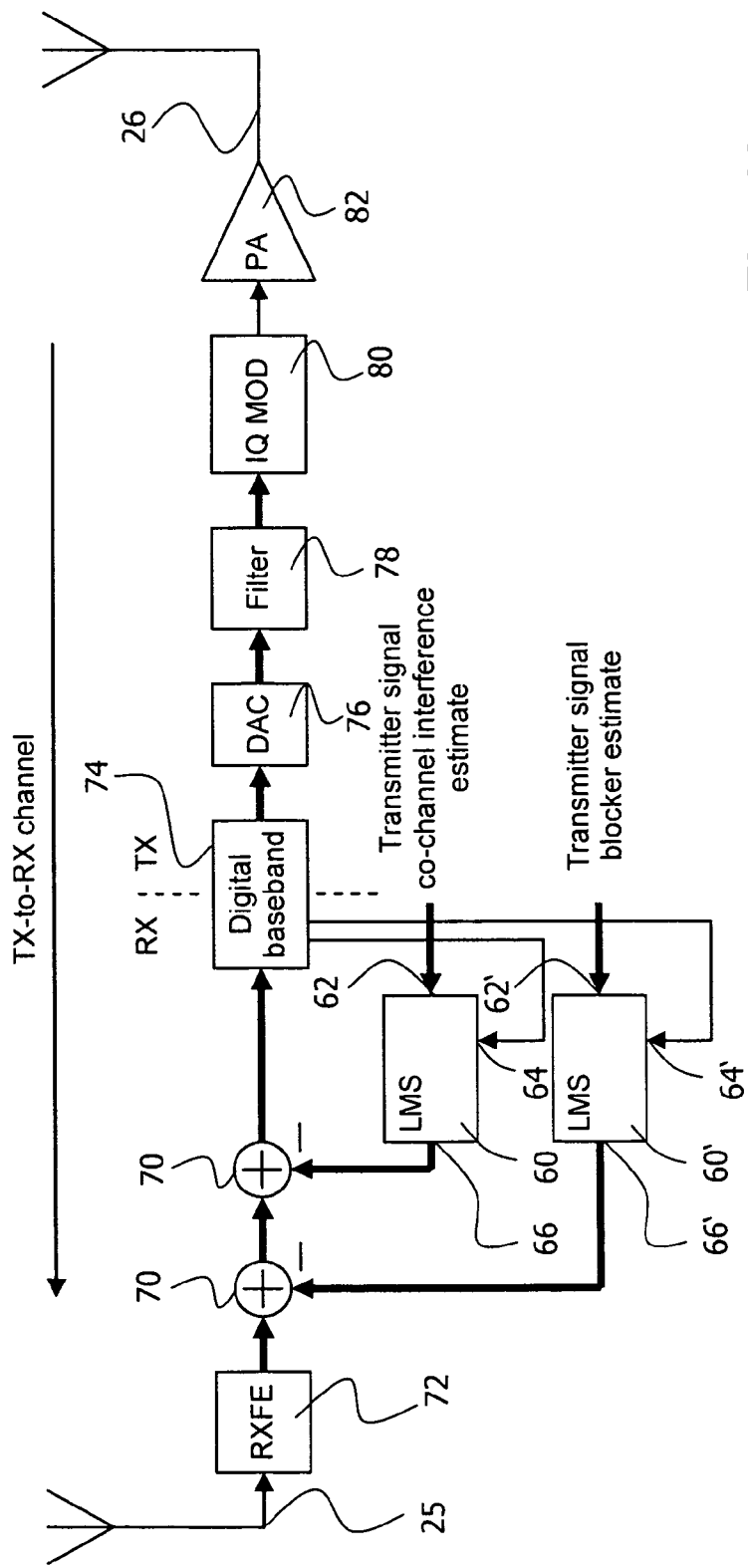

A still further embodiment of a relay node 30 is illustrated in FIG. 18. Here, the blocking part and the co-channel interference part (see FIG. 2A) are handled independently such that each part has its own interference signal estimator 60, 60'. The blocking part estimate can be obtained and subtracted from the received signal using any of the previously proposed schemes. In a similar manner, a separate path is used for the co-channel interference part, and again the means for obtaining this interference part and subtracting it can be based on any of the schemes discussed above.

Dividing self-interference cancellation into blocker and co-channel interference cancellation is particularly advantageous when the separation of the transmitted and the received signals is comparable or larger than the bandwidth of the signals. This is due to the fact that the processing bandwidth does not need to extend over both signals, but rather the bandwidth of each signal. Yet another advantage with this approach is that the baseband representation of the transmitter signal u will resemble the main lobe of the transmitter signal, and thus will suffice as far as blocker reduction is concerned (i.e., an accurate estimate of the transmitted signal with the deficiencies introduced by the non-ideal transmitter is not required to reduce the level of the main lobe by several tens of dB).

In the event that one or more of the replication blocks need to be adapted to better model the blocks in the transmitter chain, it needs to be coordinated or coupled with the execution of the interference signal estimator (i.e., the LMS algorithm) if the same or a related metric (e.g., SNR) is used as guidance for adaptation. The same applies to the case when one or more blocks in the transmitter chain and/or blocks conveying the transmitter signal back to the interference signal estimator 60 (e.g., the measurement receiver 92) need to be adapted or calibrated. It is therefore proposed to run the LMS or any other algorithm first for a predefined amount of time or until a termination condition has been fulfilled (e.g., no further improvement in C/I can be detected). This step is then followed by a block adaptation/calibration, also running for a predefined amount of time or until a termination condition has been fulfilled. This sequence is then repeated by returning to the execution of the LMS or other algorithm.

It will be increasingly common to exploit multi-antenna techniques such as MIMO and beam-forming. For such techniques, each receiver might comprise one or more of the components taught herein (such as the canceller) for each transmitter being coupled back to that receiver.

As has become apparent from the above description of exemplary embodiments, the technique presented herein allows for an efficient self-interference suppression control in a relay node. In this regard, active interference cancelation techniques may be employed. Available power margins may be exploited for a power control that aims at controlling self-interference suppression.

While the technique presented herein has been described with respect to particular embodiments, those skilled in the art will recognize that the present invention is not limited to the specific embodiments described and illustrated therein. It is to be understood that this disclosure is only illustrative. Accordingly, it is intended that the invention be limited only by the scope of the claims appended hereto.

The invention claimed is:

1. A method of controlling suppression of self-interference in a relay node configured to transmit and receive simultaneously using one of a same frequency channel and proximate frequency channels, the method comprising:
   actively cancelling a signal transmitted from the relay node that leaks back into a receiver (RX) of the relay node to suppress self-interference, the active cancellation being based on adaptive filtering;
   determining an amount of suppression needed;
   adapting a complexity of the adaptive filtering based on the amount of suppression needed;
   determining when self-interference suppression by active cancellation is insufficient;
   when insufficiency of self-interference suppression by active cancellation is determined, then signalling a base station to increase power transmitted by the base station to the relay node;
   determining that the increase of the power transmitted by the base station is one of not possible and not sufficient; and
   when the increase of the power transmitted by the base station is one of not possible and not sufficient, then decreasing a transmit power of the signal transmitted from the relay node.

2. The method of claim 1 further comprising requesting an increase of a transmit power of a signal received by the relay node.

3. The method of claim 2, further comprising:
   determining an amount of suppression after a previous increase of the transmit power of the relay node does not meet a threshold; and
   requesting an increase of the transmit power of the signal received by the relay node in response to determining that the amount of suppression does not meet the threshold.

4. The method of claim 1, further comprising decreasing the transmit power for a link to a user terminal, the transmit power of a signal received by the relay node from a base station not being reduced.

5. The method of claim 1, further comprising:
   decreasing the transmit power for a link to a user terminal; and
   requesting an increase of a transmit power of a signal received by the relay node from a base station.

6. The method of claim 1, further comprising decreasing the transmit power for a link to a base station, the transmit power of a signal received by the relay node from a user terminal not being reduced.

7. The method of claim 1, further comprising reducing a data rate supported by the relay node in correspondence with decreasing the transmit power of the relay node.

8. The method of claim 1, wherein active cancellation is performed by an echo cancellation technique.

9. The method of claim 1, wherein active cancellation includes estimating the self-interference and subtracting the estimated self-interference.

10. The method of claim 1, wherein adapting the complexity of the adaptive filtering includes increasing a number of filter taps for a channel estimation to increase an amount of suppression.

11. The method of claim 1, further comprising:
   detecting channel variations; and
   reducing a complexity of the adaptive filtering to increase tracking performance.

12. The method of claim 1, wherein the determining of when self-interference suppression is insufficient is based on a signal quality threshold.

13. The method of claim 1, wherein the determining of when self-interference suppression is insufficient is based on an available power margin.

14. A computer program product comprising program code portions stored in a non-transitory storage medium, which when executed by a computing device, cause the computing device to:
   actively cancel a signal transmitted from a relay node that leaks back into a receiver of the relay node to suppress self-interference, the active cancellation being based on adaptive filtering;
   determine an amount of suppression needed;
   adapt a complexity of the adaptive filtering based on the amount of suppression needed;
   determine when self-interference suppression by active cancellation is insufficient;
   when insufficiency of self-interference suppression by active cancellation is determined, then signal a base station to increase power transmitted by the base station to the relay node;
   determine that the increase of the power transmitted by the base station is one of not possible and not sufficient; and
   when the increase of the power transmitted by the base station is one of not possible and not sufficient, then decrease a transmit power of the signal transmitted from the relay node.

15. The computer program product of claim 14, wherein the program code is stored on a computer-readable recording medium.

16. A relay node configured to transmit and receive simultaneously using one of a same frequency channel and proximate frequency channels, the relay node comprising:
   a canceller configured to actively cancel a signal transmitted from the relay node that leaks back into a receiver (RX) of the relay node to suppress self-interference, the active cancellation being based on adaptive filtering;
   determine an amount of suppression needed;
   adapt a complexity of the adaptive filtering based on the amount of suppression needed;
   a determination component configured to determine when self-interference suppression by active cancellation is insufficient;
   a requestor component configured to:
      signal a base station to increase power transmitted by the base station to the relay node when insufficiency of self-interference suppression by active cancellation is determined;
      determine that the increase of the power transmitted by the base station is one of not possible and not sufficient; and
   a power control component configured to decrease a transmit power of the signal transmitted from the relay node when the increase of the power transmitted by the base station is one of not possible and not sufficient.

17. The relay node of claim 16, wherein the canceller is an echo canceller.

* * * * *